(12) United States Patent
Fenton et al.

(10) Patent No.: US 10,507,480 B2
(45) Date of Patent: Dec. 17, 2019

(54) METHOD AND APPARATUS FOR GENERATING A MIST

(71) Applicant: Tyco Fire Products LP, Lansdale, PA (US)

(72) Inventors: Marcus Brian Mayhall Fenton, St. Neots (GB); John Gervase Mark Heathcote, Huntingdon (GB); Alexander Guy Wallis, Adelaide (AU)

(73) Assignee: Tyco Fire Products LP, Lansdale, PA (US)

( * ) Notice: Subject to any disclaimer, the term of this patent is extended or adjusted under 35 U.S.C. 154(b) by 0 days.

(21) Appl. No.: 14/672,015

(22) Filed: Mar. 27, 2015

(65) Prior Publication Data
US 2015/0202639 A1     Jul. 23, 2015

Related U.S. Application Data

(63) Continuation of application No. 10/590,456, filed as application No. PCT/GB2005/000720 on Feb. 25, 2005, now Pat. No. 9,010,663.

(30) Foreign Application Priority Data

Feb. 26, 2004 (GB) .................................. 0404230.5
Mar. 10, 2004 (GB) .................................. 0405363.3
(Continued)

(51) Int. Cl.
*B05B 7/04* (2006.01)
*C08G 63/672* (2006.01)
(Continued)

(52) U.S. Cl.
CPC .......... *B05B 7/0483* (2013.01); *C08G 63/672* (2013.01); *C08J 5/18* (2013.01);
(Continued)

(58) Field of Classification Search
CPC ........... C08J 5/18; C08J 2367/02; C08K 3/24; C08K 5/0083; C08K 5/098; C08K 3/32;
(Continued)

(56) References Cited

U.S. PATENT DOCUMENTS 1,004,770 A * 10/1911 Galloway ............ A01G 25/023
239/533.1
1,289,812 A * 12/1918 Kinney .................. F23D 11/10
239/434.5
(Continued)

FOREIGN PATENT DOCUMENTS

CA         833980      2/1970
CN        2356760      1/2000
(Continued)

OTHER PUBLICATIONS

International Search Report for PCT/GB2008/001883, dated Sep. 26, 2008.
(Continued)

*Primary Examiner* — Arthur O. Hall
*Assistant Examiner* — Steven M Cernoch
(74) *Attorney, Agent, or Firm* — Foley & Lardner LLP

(57) ABSTRACT

Apparatus for generating a mist comprising a conduit having a mixing chamber and an exit; a transport nozzle in fluid communication with the said conduit, the transport nozzle being adapted to introduce a transport fluid into the mixing chamber; a working nozzle positioned adjacent the transport nozzle intermediate the transport nozzle and the exit, the working nozzle being adapted to introduce a working fluid into the mixing chamber; the transport and working nozzles having an angular orientation and internal geometry such that in use interaction of the transport fluid and working fluid in the mixing chamber causes the working fluid to atomize and form a dispersed vapor/droplet fl discharged as a mist from the exit, the mist comprising working fluid droplets having a substantially uniform size.

17 Claims, 15 Drawing Sheets

(30) Foreign Application Priority Data

Figure 1:
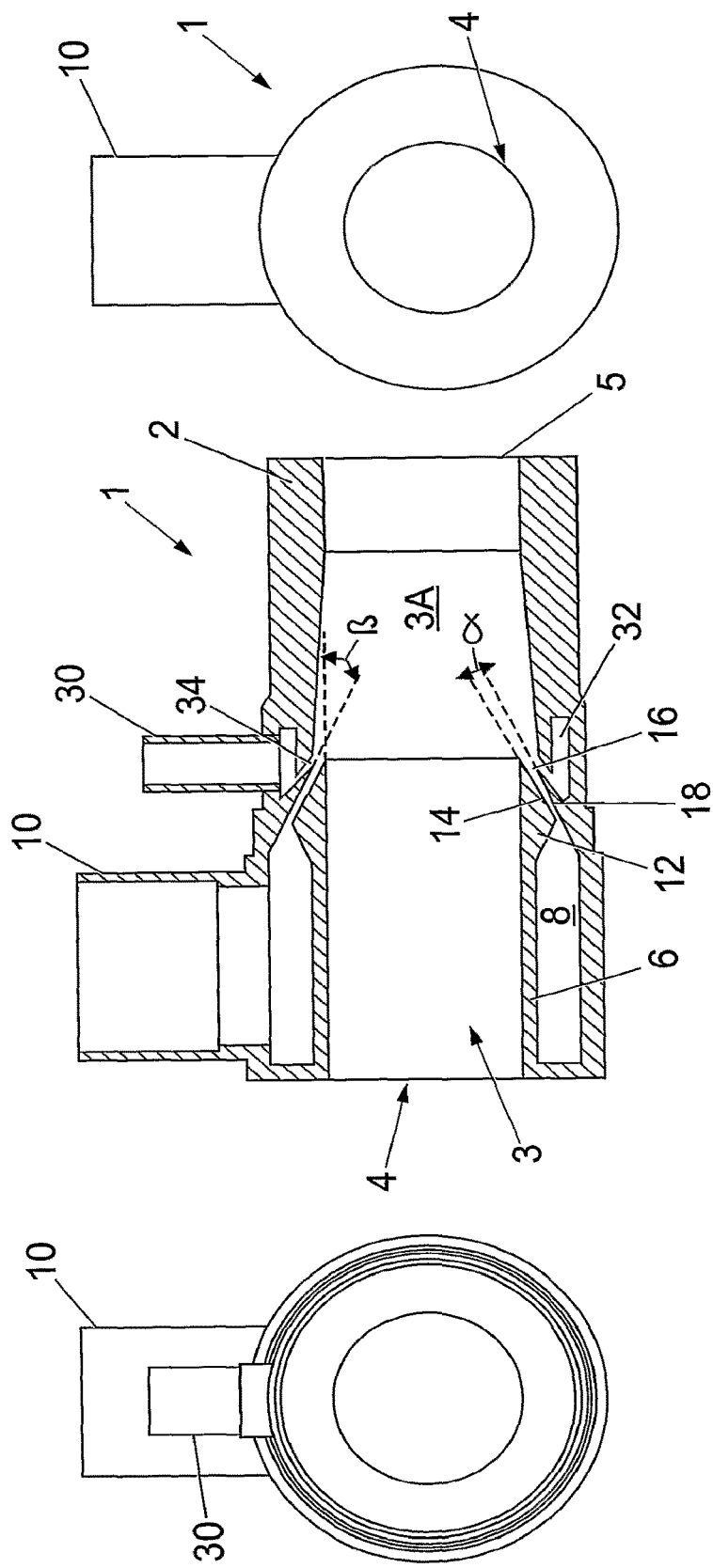

| | | | |
|---|---|---|---|
| Mar. 24, 2004 | (GB) | ................................... | 0406690.8 |
| Mar. 30, 2004 | (GB) | ................................... | 0407090.0 |
| Apr. 30, 2004 | (GB) | ................................... | 0409620.2 |
| May 11, 2004 | (GB) | ................................... | 0410518.5 |
| Jan. 12, 2005 | (GB) | ................................... | 0500580.6 |

(51) Int. Cl.

| | |
|---|---|
| *C08J 5/18* | (2006.01) |
| *C08K 3/24* | (2006.01) |
| *C08K 3/32* | (2006.01) |
| *C08K 5/00* | (2006.01) |
| *C08K 5/09* | (2006.01) |
| *D01F 6/86* | (2006.01) |
| *C08K 5/098* | (2006.01) |

(52) U.S. Cl.
CPC ................. *C08K 3/24* (2013.01); *C08K 3/32* (2013.01); *C08K 5/0083* (2013.01); *C08K 5/098* (2013.01); *D01F 6/86* (2013.01); *C08J 2367/02* (2013.01)

(58) Field of Classification Search
CPC ....... D01F 6/86; B05B 7/0483; C08L 67/025; C08L 67/02; F23D 11/104; F23D 11/102; A62C 31/02
USPC ...... 239/433, 434.5, 398, 418, 594, 11, 135, 239/138, 427, 428, 428.3, 428.5, 431, 434
See application file for complete search history.

(56) References Cited

U.S. PATENT DOCUMENTS

| | | | |
|---|---|---|---|
| 1,592,448 A * | 7/1926 | Debus ...................... | A21B 3/16 118/DIG. 8 |
| 2,083,801 A | 6/1937 | Eddy | |
| 2,396,290 A * | 3/1946 | Schwarz ................. | F04F 5/467 417/170 |
| 2,971,325 A | 2/1961 | Gongwer | |
| 3,073,534 A * | 1/1963 | Hampshire ........... | B05B 7/1495 239/422 |
| 3,259,310 A | 7/1966 | Frey | |
| 3,259,320 A | 7/1966 | Frey | |
| 3,265,027 A | 8/1966 | Brown | |
| 3,304,564 A * | 2/1967 | Green ..................... | A01K 63/04 137/205.5 |
| 3,326,472 A * | 6/1967 | Gjerde ..................... | F23D 11/10 239/422 |
| 3,402,555 A | 9/1968 | Piper | |
| 3,411,301 A | 11/1968 | Olsen | |
| 3,456,871 A | 7/1969 | Gosling | |
| 3,493,191 A | 2/1970 | Hughes | |
| 3,664,768 A | 5/1972 | Mays et al. | |
| 3,684,188 A * | 8/1972 | Miller ...................... | E04F 21/12 239/422 |
| 3,799,195 A | 3/1974 | Hermans | |
| 3,823,929 A | 7/1974 | Rymarchyk et al. | |
| 3,873,024 A * | 3/1975 | Probst ..................... | B05B 5/032 239/113 |
| 3,889,623 A | 6/1975 | Arnold | |
| 3,984,504 A | 10/1976 | Pick | |
| 4,014,961 A | 3/1977 | Popov | |
| 4,072,470 A | 2/1978 | Tsuto et al. | |
| 4,101,246 A | 7/1978 | Erickson | |
| 4,157,304 A | 6/1979 | Molvar | |
| 4,175,706 A * | 11/1979 | Gerstmann ........... | B05B 7/0416 239/414 |
| 4,192,465 A | 3/1980 | Hughes | |
| 4,201,596 A | 5/1980 | Church et al. | |
| 4,212,168 A | 7/1980 | Bouchard et al. | |
| 4,221,558 A | 9/1980 | Santisi | |
| 4,279,663 A | 7/1981 | Burroughs et al. | |
| 4,314,670 A * | 2/1982 | Walsh, Jr. ............ | B05B 7/0416 239/11 |
| 4,425,433 A | 1/1984 | Neves | |
| 4,461,648 A | 7/1984 | Foody | |
| 4,487,553 A * | 12/1984 | Nagata .................... | F04F 5/466 261/76 |
| 4,659,521 A | 4/1987 | Alleman | |
| 4,718,870 A | 1/1988 | Watts | |
| 4,738,614 A | 4/1988 | Snyder et al. | |
| 4,809,911 A | 3/1989 | Ryan | |
| 4,836,451 A | 6/1989 | Herrick et al. | |
| 4,915,300 A | 4/1990 | Ryan | |
| 4,915,302 A | 4/1990 | Kraus et al. | |
| 5,014,790 A | 5/1991 | Papavergos | |
| 5,061,406 A | 10/1991 | Cheng | |
| 5,129,583 A * | 7/1992 | Bailey .................... | B05B 1/34 239/427 |
| 5,138,937 A | 8/1992 | Zietlow | |
| 5,171,090 A | 12/1992 | Wiemers | |
| 5,205,648 A * | 4/1993 | Fissenko ............... | B01F 3/0807 137/3 |
| 5,240,724 A | 8/1993 | Otto et al. | |
| 5,249,514 A | 10/1993 | Otto et al. | |
| 5,252,298 A | 10/1993 | Jones | |
| 5,269,461 A | 12/1993 | Davis | |
| 5,275,486 A | 1/1994 | Fissenko | |
| 5,312,041 A * | 5/1994 | Williams .................. | B05B 7/06 169/14 |
| 5,323,967 A | 6/1994 | Tanaka et al. | |
| 5,338,113 A | 8/1994 | Fissenko | |
| 5,344,345 A | 9/1994 | Nagata | |
| 5,366,288 A | 11/1994 | Dahllof et al. | |
| 5,484,107 A * | 1/1996 | Holmes ................. | B05B 7/0408 239/427.5 |
| 5,492,276 A | 2/1996 | Kaylor | |
| 5,495,893 A | 3/1996 | Roberts et al. | |
| 5,520,331 A | 5/1996 | Wolfe | |
| 5,544,961 A | 8/1996 | Fuks et al. | |
| 5,597,044 A | 1/1997 | Roberts et al. | |
| 5,598,700 A | 2/1997 | Varshay et al. | |
| 5,615,836 A * | 4/1997 | Graef ..................... | B05B 1/326 239/428.5 |
| 5,661,968 A | 9/1997 | Gabriel | |
| 5,692,371 A | 12/1997 | Varshay et al. | |
| 5,738,762 A | 4/1998 | Ohsol | |
| 5,779,159 A * | 7/1998 | Williams ............... | A62C 31/12 239/424.5 |
| 5,810,252 A | 9/1998 | Pennamen et al. | |
| 5,851,139 A | 12/1998 | Xu | |
| 5,857,773 A | 1/1999 | Tammelin | |
| 5,860,598 A | 1/1999 | Cruz | |
| 5,863,128 A | 1/1999 | Mazzei | |
| 6,003,789 A | 12/1999 | Base et al. | |
| 6,029,911 A | 2/2000 | Watanabe et al. | |
| 6,065,683 A | 5/2000 | Akin et al. | |
| 6,098,896 A | 8/2000 | Haruch | |
| 6,110,356 A | 8/2000 | Hedrick et al. | |
| 6,200,486 B1 | 3/2001 | Chahine et al. | |
| 6,299,343 B1 | 10/2001 | Pekerman | |
| 6,308,740 B1 | 10/2001 | Smith et al. | |
| 6,338,444 B1 | 1/2002 | Swan | |
| 6,371,388 B2 | 4/2002 | Utter et al. | |
| 6,405,944 B1 | 6/2002 | Benalikhoudja | |
| 6,456,871 B1 | 9/2002 | Hsu et al. | |
| 6,478,240 B1 | 11/2002 | Dorkin et al. | |
| 6,502,979 B1 | 1/2003 | Kozyuk | |
| 6,503,461 B1 | 1/2003 | Burgard et al. | |
| 6,523,991 B1 * | 2/2003 | Maklad ................. | B01F 5/0403 137/889 |
| 6,595,163 B2 | 7/2003 | Dumaz et al. | |

(56) References Cited

U.S. PATENT DOCUMENTS

| | | | |
|---|---|---|---|
| 6,623,154 B1 * | 9/2003 | Garcia | B01F 5/0415 137/888 |
| 6,637,518 B1 | 10/2003 | Hillier et al. | |
| 6,659,635 B2 | 12/2003 | Ekholm | |
| 6,662,549 B2 | 12/2003 | Burns | |
| 6,796,704 B1 | 9/2004 | Lott | |
| 6,802,638 B2 * | 10/2004 | Allen | B01F 5/0475 366/152.1 |
| 6,830,368 B2 | 12/2004 | Fukano | |
| 6,883,332 B2 * | 4/2005 | Steinthorsson | F23D 11/107 60/740 |
| 6,969,012 B2 * | 11/2005 | Kangas | B05B 7/10 239/398 |
| 6,981,997 B2 | 1/2006 | Williams et al. | |
| 6,989,091 B2 | 1/2006 | Jorgensen | |
| 7,029,165 B2 * | 4/2006 | Allen | B01F 5/0475 366/163.2 |
| 7,036,753 B2 | 5/2006 | Huffman | |
| 7,040,551 B2 | 5/2006 | Rummel | |
| 7,080,793 B2 | 7/2006 | Borisov et al. | |
| 7,111,975 B2 | 9/2006 | Fenton et al. | |
| 7,207,712 B2 | 4/2007 | Kozyuk | |
| 7,559,370 B2 | 7/2009 | Crabtree et al. | |
| 7,621,512 B2 | 11/2009 | Brockmann et al. | |
| 7,667,082 B2 | 2/2010 | Kozyuk | |
| 7,967,221 B2 * | 6/2011 | Snyder | B05B 7/0416 239/418 |
| 2002/0162518 A1 * | 11/2002 | Dumaz | F04F 5/461 122/404 |
| 2003/0147301 A1 * | 8/2003 | Ekholm | B01F 5/048 366/160.1 |
| 2003/0150624 A1 | 8/2003 | Rummel | |
| 2004/0141410 A1 * | 7/2004 | Fenton | F04F 5/24 366/163.2 |
| 2004/0188104 A1 * | 9/2004 | Borisov | A62C 5/008 169/62 |
| 2005/0000700 A1 | 1/2005 | Sundholm | |
| 2005/0150971 A1 * | 7/2005 | Zhou | B01J 2/04 239/1 |
| 2005/0266539 A1 | 12/2005 | Hochberg et al. | |
| 2006/0102749 A1 | 5/2006 | Crabtree et al. | |
| 2006/0144760 A1 | 7/2006 | Duyvesteyn et al. | |
| 2007/0000700 A1 | 1/2007 | Switzer | |
| 2007/0095946 A1 | 5/2007 | Ryan | |
| 2007/0210186 A1 * | 9/2007 | Fenton | A62C 5/002 239/422 |
| 2008/0310970 A1 * | 12/2008 | Fenton | F04F 5/14 417/198 |
| 2009/0052275 A1 | 2/2009 | Jansson | |
| 2009/0072041 A1 | 3/2009 | Hashiba | |
| 2009/0240088 A1 * | 9/2009 | Fenton | B01F 3/1214 568/840 |
| 2009/0314500 A1 * | 12/2009 | Fenton | A62C 31/02 169/16 |
| 2010/0085883 A1 | 4/2010 | Zaiser | |
| 2010/0129888 A1 | 5/2010 | Thorup et al. | |
| 2010/0230119 A1 * | 9/2010 | Worthy | A62C 31/02 169/46 |
| 2010/0233769 A1 | 9/2010 | Heathcote et al. | |
| 2010/0301129 A1 | 12/2010 | Fenton et al. | |
| 2011/0127347 A1 | 6/2011 | Worthy et al. | |
| 2011/0203813 A1 | 8/2011 | Fenton et al. | |
| 2012/0018531 A1 | 1/2012 | Fenton et al. | |

FOREIGN PATENT DOCUMENTS

| | | |
|---|---|---|
| DE | 3316233 | 11/1984 |
| EP | 282061 | 3/1988 |
| EP | 0362052 | 4/1990 |
| EP | 0471321 | 11/1995 |
| EP | 0889244 | 1/1999 |
| EP | 0 911 082 A1 | 4/1999 |
| EP | 1 072 320 A1 | 1/2001 |
| EP | 1 163 931 A2 | 12/2001 |
| EP | 1034029 | 3/2003 |
| EP | 1421996 | 5/2004 |
| EP | 1549856 | 6/2007 |
| EP | 2070881 | 6/2009 |
| FR | 474 904 | 3/1915 |
| FR | 1354965 | 3/1964 |
| FR | 2120393 | 8/1972 |
| FR | 2 376 384 | 7/1978 |
| FR | 2613639 | 4/1987 |
| FR | 2613639 | 10/1988 |
| GB | 995660 | 6/1965 |
| GB | 1028211 | 5/1966 |
| GB | 1205776 | 9/1970 |
| GB | 1227444 | 4/1971 |
| GB | 1320016 A | 6/1973 |
| GB | 2207952 | 7/1988 |
| GB | 2242370 | 11/1993 |
| GB | 2313410 | 11/1997 |
| GB | 2384027 | 1/2002 |
| GB | 0223572.9 | 10/2002 |
| GB | 0227053.6 | 11/2002 |
| GB | 0301236.6 | 6/2003 |
| GB | 0404230.5 | 2/2004 |
| GB | 0405363.3 | 3/2004 |
| GB | 0406690.8 | 3/2004 |
| GB | 0407090.0 | 3/2004 |
| GB | 0409620.2 | 4/2004 |
| GB | 0410518.5 | 5/2004 |
| GB | 0416914.0 | 7/2004 |
| GB | 0416915.7 | 7/2004 |
| GB | 0417961.0 | 8/2004 |
| GB | 0428343.8 | 12/2004 |
| GB | 0500580.6 | 1/2005 |
| GB | 0500581.4 | 1/2005 |
| GB | 0618196.0 | 9/2006 |
| GB | 0708482.5 | 5/2007 |
| GB | 0710659.4 | 6/2007 |
| GB | 0710663.6 | 6/2007 |
| GB | 0721995.9 | 11/2007 |
| GB | 0803959.6 | 3/2008 |
| GB | 0805791.1 | 3/2008 |
| GB | 0806182.2 | 4/2008 |
| GB | 0810155.2 | 6/2008 |
| GB | 0818362.6 | 10/2008 |
| JP | 03-260405 | 11/1991 |
| JP | 2004-184000 | 6/1992 |
| JP | 10-141299 | 5/1998 |
| JP | 10-226503 | 8/1998 |
| JP | 2001-354319 | 12/2001 |
| JP | 2003-515702 | 5/2003 |
| NL | 7409053 | 1/1975 |
| RU | 2040322 | 5/1992 |
| RU | 2142580 | 12/1999 |
| RU | 2152465 | 7/2000 |
| SU | 1653853 | 6/1991 |
| WO | WO2010/041080 | 4/1920 |
| WO | WO89/07204 | 8/1989 |
| WO | WO89/10184 | 11/1989 |
| WO | WO 1992/20453 | 11/1992 |
| WO | WO 1992/20454 | 11/1992 |
| WO | WO94/08724 | 4/1994 |
| WO | WO 1997/38757 | 10/1997 |
| WO | PCT/US98/005275 | 3/1998 |
| WO | PCT/RU97/000299 | 9/1998 |
| WO | WO2000/071235 | 1/2000 |
| WO | WO2000/009236 | 2/2000 |
| WO | PCT/RU00/000118 | 4/2000 |
| WO | WO 2000/37143 | 6/2000 |
| WO | WO01/36105 | 5/2001 |
| WO | WO 01/76764 | 10/2001 |
| WO | WO2001/94197 | 12/2001 |
| WO | WO 2003/030995 A2 | 4/2003 |
| WO | WO 2003/061769 A1 | 7/2003 |
| WO | WO03/072952 | 9/2003 |
| WO | WO2004/033920 | 4/2004 |
| WO | WO2004/038031 | 6/2004 |
| WO | WO2004/057196 | 7/2004 |

(56) References Cited

FOREIGN PATENT DOCUMENTS

| WO | PCT/GB2005/000708 | 2/2005 |
|---|---|---|
| WO | PCT/GB2005/000720 | 2/2005 |
| WO | WO 2005/082546 A1 | 9/2005 |
| WO | WO 2005/115555 A1 | 12/2005 |
| WO | WO2005/123263 | 12/2005 |
| WO | WO2006/010949 | 2/2006 |
| WO | WO2006/024242 | 3/2006 |
| WO | WO2006/034590 | 4/2006 |
| WO | WO2006/132557 | 12/2006 |
| WO | WO2007/037752 | 4/2007 |
| WO | PCT /GB2007/003492 | 9/2007 |
| WO | WO2008/062218 | 5/2008 |
| WO | PCT /GB2008/01883 | 6/2008 |
| WO | PCT/GB2008/051042 | 11/2008 |
| WO | PCT/US08/012571 | 11/2008 |
| WO | WO2008/135775 | 11/2008 |
| WO | WO2008/135783 | 11/2008 |
| WO | WO2009/060240 | 11/2008 |
| WO | PCT/GB2009/050626 | 6/2009 |
| WO | WO2009/147443 | 12/2009 |
| WO | WO2010/003090 | 1/2010 |
| WO | WO2010/049815 | 5/2010 |

OTHER PUBLICATIONS

Arvidson, et al., The VINNOVA water mist research project: A description of the 500 m3 machinery space tests, SP Swedish National Testing and Research Institute, SP Fire Technology, SP Report 2003:19.
Dlugogorski, et al., Water Vapour as an Inerting Agent, Halon Options Technical Working Conference, pp. 7-18 (May 6-8, 1997).
High pressure water mist for efficient fire protection, Engineer Live (Oct. 8, 2007).
Liu, et al., A Review of water mist fire suppression systems—fundamental studies, National Research Council Canada (2000).
Liu, et al., A Review of water mist fire suppression technology: Part II—Application studies, National Research Council Canada (Feb. 2001).
Liu, et al., Review of Three Dimensional Water Fog Techniques for Firefighting, National Research Council Canada (Dec. 2002).
Mawhinney, et al., A State-of-the-Art Review of Water Mist Fire Suppression Research and Development—1996, National Research Council Canada (Jun. 1996).
Mawhinney, et al., Report of the Committee on Water Mist Fire Suppression Systems, NFPA 750, pp. 141-147 (Nov. 2002 ROC).
Nigro, et al., Water Mist Fire Protection Solution for the Under-Roof Areas of the La Scala Theatre in Milan, PDX® FireMist Comparative Data, Pursuit Dynamics plc (Jul. 1, 2005).
Schlosser, et al., In Situ Determination of Molecular Oxygen Concentrations in Full-Scale Fire Suppression Tests Using TDLAS, The 2nd Joint Meeting of the US Sections of the Combustion Institute, Oakland, CA (Mar. 28, 2001).
Vaari, A Study of Total Flooding Water Mist Fire Suppression System Performance using a Transient One-Zone Computer Model, Fire Technology, 37, 327-342 (2001).
Office Action (Paper No. 20081210) from related application (U.S. Appl. No. 10/590,456, filed Oct. 31, 2006) dated Dec. 17, 2008.
Amendment and Response to Office Action in related application (U.S. Appl. No. 10/590,456), which was filed Mar. 17, 2009 (including Electronic Acknowledgement Receipt).
Fire Suppression by Water Mist, Naval Research Laboratory, Washington, DC and Physikalisch-Chemisches Institut, Universitat Heidelberg.
Patent Abstracts of Japan, vol. 016, No. 498 (M-1325), Oct. 15, 1992 (Oct. 15, 1992) & JP 04 184000 A (Mitsui Eng & Shipbuiid Co. Ltd), Jun. 30, 1992 (Jun. 30, 1992).
Cincotta, "From the Lab to Production: Direct Steam Injection Heating of Fibrous Slurries", Biomass Magazine, Jul. 1, 2008.
Khanal, et al., "Ultrasound Enhanced Glucose Release From Corn in Ethanol Plants", Biotechnology and Bioengineering, vol. 98, No. 5, pp. 978-985, Dec. 1, 2007.
Hagen, Energy economy by continuous steaming and mashing, International Food Information Service (IFIS), Frankfurt-Main, DE (1984).
Kim, Andrew, Overview of Recent Progress in Fire Suppression Technology, Institute for Research in Construction, NRCC-45690, Invited Keynote Lecture of the 2nd NRIFD Symposium, Proceedings, Tokyo, Japan, Jul. 17-19, 2002, pp. 1-13.
Patent Abstracts of Japan, JP 03-260405, published Nov. 20, 1991.
Machine English language translation by EPO of FR 1354965.
U.S. Appl. No. 12/996,348 (Publication No. 2011-0127347 A1) Co-Pending Related U.S. Appl. No. 10/590,527.
U.S. Appl. No. 10/590,456 (Publication No. 2007-0210186 A1) Co-Pending Related U.S. Appl. No. 10/590,527.
U.S. Appl. No. 12/381,584 (Publication No. 2009-0230632A1) Co-Pending Related U.S. Appl. No. 10/590,527.
U.S. Appl. No. 12/741,941 (Publication No. 2010-0301129 A1) Co-Pending Related U.S. Appl. No. 10/590,527.
U.S. Appl. No. 12/741,995 (Publication No. 2012-0018531 A1) Co-Pending Related U.S. Appl. No. 10/590,527.
U.S. Appl. No. 12/742,046 (Publication No. 2011-0203813A1) Co-Pending Related U.S. Appl. No. 10/590,527.
U.S. Appl. No. 12/592,930 (Publication No. 2010-0230119A1) Co-Pending Related 10/590,527.
Supplementary EP Search Report and Search Opinion issued in EP Patent Application No. EP 08846644.6 that corresponds to co-pending U.S. Appl. No. 12/742,046; dated Apr. 16, 2013.
Final Scientific Report, "New Regenerative Cycle for Vapor Compression Refrigeration", DE-FG36-04G014327.
Patent Abstracts of Japan, vol. 2002, No. 4, Aug. 4, 2002 (Aug. 4, 2002) & JP 2001 354319 A (Ogawa Jidosha:KK), Dec. 25, 2001 (Dec. 25, 2001).

* cited by examiner

METHOD AND APPARATUS FOR GENERATING A MIST

This application is continuation of U.S. patent application Ser. No. 10/590,456 filed Oct. 31, 2006, which is 371 US national phase of international application PCT/GB2005/000720 filed Feb. 25, 2005 which designated the U.S. and claims benefit of priority to GB 0404230.5 filed Feb. 26, 2004, GB 0405363.3 filed Mar. 10, 2004, GB 0406690.8 filed Mar. 24, 2004, GB 0407090.0 filed Mar. 30, 2004, GB 0409620.2 filed Apr. 30, 2004, GB 0410518.5 filed May 11, 2004 and GB 0500580.6 filed Jan. 12, 2005, respectively, the entire content of each of which is hereby incorporated by reference.

The present invention relates to a method and apparatus for generating a mist and in particular, but not exclusively, to a method and apparatus for the generation of a liquid droplet mist with application to, but not restricted to, water mist generation for fire extinguishing, suppression and control.

It is well known in the art that there are three major contributing factors required to maintain combustion. These are known as the fire triangle, i.e. fuel, heat and oxygen. Conventional fire extinguishing and suppression systems aim to remove or at least minimise at least one of these major factors. Typically fire suppression systems use inter alia water, CO2, Halon, dry powder or foam. Water systems act by removing the heat from the fire, whilst CO2 systems work by displacing oxygen.

Another aspect of combustion is known as the flame chain reactions. The reaction relies on free radicals that are created in the combustion process and are essential for its continuation. Halon operates by attaching itself to the free radicals and thus preventing further combustion by interrupting the flame chain reaction.

The major disadvantage of water systems is that a large amount of water is usually required to extinguish the fire. This presents a first problem of being able to store a sufficient volume of water or quickly gain access to an adequate supply. In addition, such systems can also lead to damage by the water itself, either in the immediate region of the fire, or even from water seepage to adjoining rooms. CO2 and Halon systems have the disadvantage that they cannot be used in environments where people are present as it creates an atmosphere that becomes difficult or even impossible for people to breathe in. Halon has the further disadvantage of being toxic and damaging to the environment. For these reasons the manufacture of Halon is being banned in most countries.

To overcome the above disadvantages a number of alternative systems utilising liquid mist have emerged. The majority of these utilise water as the suppression media, but present it to the fire in the form of a water mist. A water mist system overcomes the above disadvantages of conventional systems by using the water mist to reduce the heat of the vapour around the fire, displace the oxygen and also disrupt the flame chain reaction. Such systems use a relatively small amount of water and are generally intended for class A and B fires, and even electrical fires.

Current water mist systems utilise a variety of methods for generating the water droplets, using a range of pressures. A major disadvantage of many of these systems is that they require a relatively high pressure to force the water through injection nozzles and/or use relatively small nozzle orifices to form the water mist. Typically these pressures are 20 bar or greater. As such, many systems utilise a gas-pressurised tank to provide the pressurised water, thus limiting the run time of the system. Such systems are usually employed in closed areas of known volume such as engine rooms, pump rooms, and computer rooms. However, due to their finite storage capacity, such systems have the limitation of a short run time. Under some circumstances, such as a particularly fierce fire, or if the room is no longer sealed, the system may empty before the fire is extinguished. Another major disadvantage of these systems is that the water mist from these nozzles does not have a particularly long reach, and as such the nozzles are usually fixed in place around the room to ensure adequate coverage.

Conventional water mist systems use a high pressure nozzle to create the water droplet mist. Due to the droplet formation mechanism of such a system, and the high tendency for droplet coalescence, an additional limitation of this form of mist generation is that it creates a mist with a wide range of water droplet sizes. It is known that water droplets of approximately 40-50 μm in size provide the optimum compromise for fire suppression for a number of fire scenarios. For example, a study by the US Naval Research Laboratories found that a water mist with droplets less than 42 μm in size was more effective at extinguishing a test fire than Halon 1301. A water mist comprised of droplets in the approximate size range of 40-50 μm provides an optimum compromise of having the greatest surface area for a given volume, whilst also providing sufficient mass to project a sufficient distance and also penetrate into the heat of the fire. Conventional water mist systems comprised of droplets with a lower droplet size will have insufficient mass, and hence momentum, to project a sufficient distance and also penetrate into the heat of a fire.

The majority of conventional water mist systems only manage to achieve a low percentage of the water droplets in this key size range.

An additional disadvantage of the conventional water mist systems, generating a water mist with such a wide range of droplet sizes, is that the majority of fire suppression requires line-of-sight operation. Although the smaller droplets will tend to behave as a gas the larger droplets in the flow will themselves impact with these smaller droplets so reducing their effectiveness. A mist which behaves more akin to a gas cloud has the advantages of reaching non line-of-sight areas, so eliminating all hot spots and possible re-ignition zones. A further advantage of such a gas cloud behaviour is that the water droplets have more of a tendency to remain airborne, thereby cooling the gases and combustion products of the fire, rather than impacting the surfaces of the room. This improves the rate of cooling of the fire and also reduces damage to items in the vicinity of the fire.

According to a first aspect of the present invention there is provided an apparatus for generating a mist comprising:
  a conduit having a mixing chamber and an exit;
  a transport nozzle in fluid communication with the said conduit, the transport nozzle being adapted to introduce a transport fluid into the mixing chamber;
  a working nozzle positioned adjacent the transport nozzle intermediate the transport nozzle and the exit, the working nozzle being adapted to introduce a working fluid into the mixing chamber;
  the transport and working nozzles having an angular orientation and internal geometry such that in use interaction of the transport fluid and working fluid in the mixing chamber causes the working fluid to atomise and form a dispersed vapour/droplet flow regime, which is discharged as a mist from the exit, the mist comprising working fluid dropl Typically at least 60% of the droplets by volume have a size within 30% of the median size, although the invention is not limited to this. In a particularly uniform mist the proportion may be 70% or 80% or more of the droplets by volume having a size within 30%, 25%, 20% or less of the median size.

Preferably the transport and/or working nozzle substantially circumscribes the conduit.

Preferably the angular orientation and internal geometry of the transport and working nozzles is such that the size of the working fluid droplets is less than 50 µm.

Preferably the mixing chamber includes a converging portion.

Preferably the mixing chamber includes a diverging portion.

Preferably the apparatus includes a second transport nozzle being adapted to introduce further transport fluid or a second transport fluid into the mixing chamber.

Preferably the second transport nozzle is positioned nearer to the exit than the working nozzle, such that the working nozzle is intermediate both transport nozzles.

Preferably the mixing chamber includes an inlet adapted to introduce an inlet fluid into the mixing chamber, the inlet being distal from the exit, the transport and working nozzles being arranged intermediate the inlet and exit.

Preferably the apparatus includes a supplementary nozzle arranged inside the transport nozzle and adapted to introduce further transport fluid or a second transport fluid into the mixing chamber.

Preferably the supplementary nozzle is arranged axially in the mixing chamber.

Preferably the supplementary nozzle extends forward of the transport nozzle.

Preferably the supplementary nozzle is shaped with a convergent-divergent profile to provide supersonic flow of the transport fluid which flows therethrough.

Preferably the transport nozzle is shaped such that the transport fluid introduced into the mixing chamber through the transport nozzle has a divergent or convergent flow pattern.

Preferably the transport nozzle has inner and outer surfaces each being substantially frustoconical in shape.

Preferably the working nozzle is shaped such that working fluid introduced into the mixing chamber through the working nozzle has a convergent or divergent flow pattern.

Preferably the working nozzle has inner and outer surfaces each being substantially frustoconical in shape.

Preferably the apparatus further includes control means adapted to control one or more of droplet size, droplet distribution, spray cone angle and projection distance.

Preferably the apparatus further includes control means to control one or more of the flow rate, pressure, velocity, quality, and temperature of the working or transport fluids.

Preferably the control means includes means to control the angular orientation and internal geometry of the transport and working nozzles.

Preferably the control means includes means to control the internal geometry of at least part of the mixing chamber or exit to vary it between convergent and divergent.

Preferably the internal geometry of the transport nozzles has an area ratio, namely exit area to throat area, in the range 1.75 to 15, having an included angle α substantially equal to or less than 6 degrees for supersonic flow and substantially equal to or less than 12 degrees for sub-sonic flow.

Preferably the transport nozzle is oriented at an angle β of between 0 to 30 degrees.

Preferably the mixing chamber is closed upstream of the transport nozzle.

Preferably the exit of the apparatus is provided with a cowl to control the mist.

Preferably the cowl comprises a plurality of separate sections arranged radially, each section adapted to control and re-direct a portion of the discharge of mist emerging from the exit.

Preferably the apparatus is located within a further cowl.

Preferably the conduit includes a passage.

Preferably at least one of the passage, the transport nozzle(s), working nozzle(s) and supplementary nozzle(s) has a turbulator to induce turbulence of the fluid therethrough prior to the fluid being introduced into the mixing chamber.

According to a second aspect of the present invention there is provided a method of generating a mist comprising the steps of:

providing apparatus for generating a mist comprising a transport and working nozzle and a conduit, the conduit having a mixing chamber and an exit;

introducing a stream of transport fluid into the mixing chamber through the transport nozzle;

introducing a working fluid into the mixing chamber through the working nozzle downstream of the transport nozzle nearer to the exit;

atomising the working fluid by interaction of the transport fluid with the working fluid to form a dispersed vapour/droplet flow regime; and discharging the dispersed vapour/droplet flow regime through the exit as a mist comprising working fluid droplets of substantially uniform size.

Preferably the apparatus is any apparatus according to the first aspect of the present invention.

Preferably the stream of transport fluid introduced into the mixing chamber is annular.

Preferably the working fluid droplets have a size less than 50 µm.

Preferably the method includes the step of introducing the transport fluid into the mixing chamber in a continuous or discontinuous or intermittent or pulsed manner.

Preferably the method includes the step of introducing the transport fluid into the mixing chamber as a supersonic flow.

Preferably the method includes the step of introducing the working fluid into the mixing chamber in a continuous or discontinuous or intermittent or pulsed manner.

Preferably the method includes the step of introducing the transport fluid into the mixing chamber as a sub-sonic flow.

Preferably the mist is controlled by modulating at least one of the following parameters:

the flow rate, pressure, velocity, quality and/or temperature of the transport fluid;

the flow rate, pressure, velocity, quality and/or temperature of the working fluid;

the flow rate, pressure, velocity, quality and/or temperature of the inlet fluid;

the angular orientation of the transport and/or working and/or supplementary nozzle(s) of the apparatus;

the internal geometry of the transport and/or working and/or supplementary nozzle(s) of the apparatus; and the internal geometry, length and/or cross section of the mixing chamber.

Preferably the method includes mixing the transport and working fluid together by means of a high velocity transport fluid jet issuing from the transport nozzle.

Preferably the method includes the generation of condensation shocks and/or momentum transfer to provide suction within the apparatus.

Preferably the method includes inducing turbulence of the inlet fluid prior to it being introduced into the mixing chamber.

Preferably the method includes inducing turbulence of the working fluid prior to it being introduced into the mixing chamber.

Preferably the method includes inducing turbulence of the transport fluid prior to it being introduced into the mixing chamber.

Preferably the transport fluid is steam or an air/steam mixture.

Preferably the working fluid is water or a water-based liquid.

Preferably the mist is used for fire suppression.

Preferably the mist is used for decontamination.

Preferably the mist is used for gas scrubbing.

Embodiments of the present invention will now be described, by way of example only, with reference to the accompanying drawings in which:

FIG. 1 is a cross-sectional elevation view of an apparatus for generating a mist in accordance with a first embodiment of the present invention;

FIGS. 2 to 4 are schematics showing an over expanded transport nozzle, an under expanded transport nozzle, and a largely over expanded transport nozzle, respectively;

FIGS. 5 to 10 show alternative arrangements of a contoured passage to initiate turbulence;

FIG. 11 is a schematic showing the interaction of a transport and working fluid as they issue from a transport and working nozzle;

FIG. 12 is a cross-sectional elevation view of an alternative embodiment of the apparatus of FIG. 1 having a diverging mixing chamber;

FIG. 13 is a cross-sectional elevation view of an alternative embodiment of the apparatus of FIG. 12 having an additional transport nozzle;

FIG. 14 is a cross-sectional elevation view of the apparatus of FIG. 1 enclosed in a casing;

FIG. 15 is a cross-sectional elevation view of an apparatus for generating a mist substantially similar to FIG. 1 save that a mixing chamber has been closed upstream;

FIG. 16 is a cross-sectional elevation view of an apparatus for generating a mist in accordance with an alternative embodiment of the present invention;

FIG. 17 is a cross-sectional elevation view of an alternative embodiment of the apparatus of FIG. 16 having an additional transport nozzle;

FIG. 18 is a cross-sectional elevation view of an apparatus for generating a mist in accordance with a further alternative embodiment of the present invention;

FIG. 19 is a cross-sectional elevation view of an additional embodiment of the apparatus of FIG. 18 having an additional transport nozzle;

FIG. 20 is a cross-sectional elevation view of an apparatus for generating a mist in accordance with yet a further embodiment of the present invention; and FIG. 21 is a cross-sectional elevation view of the apparatus of FIG. 20 having a modification.

Where appropriate, like reference numerals have been substantially used for like parts throughout the specification.

Referring to FIG. 1 there is shown an apparatus for generating a mist, a mist generator 1, comprising a conduit or housing 2 defining a passage 3 providing an inlet 4 for the introduction of an inlet fluid, an outlet or exit 5, and a mixing chamber 3A, the passage 3 being of substantially constant circular cross section.

The passage 3 may be of any convenient cross-sectional shape suitable for the particular application of the mist generator 1. The passage 3 shape may be circular, rectilinear or elliptical, or any intermediate shape, for example curvilinear.

The mixing chamber 3A is of constant cross-sectional area but the cross-sectional area may vary along the mixing chamber's length with differing degrees of reduction or expansion, i.e. the cross-sectional area of the mixing chamber may taper at different angles at different points along its length. The mixing chamber may taper from the location of the transport nozzle 16 and the taper ratio may be selected such that the multi-phase flow velocity and trajectory is maintained at its optimum or desired position.

The mixing chamber 3A is of variable length in order to provide a control on the mist's droplet formation parameters, i.e. droplet size, droplet density/distribution, velocity (projected distance) and spray cone angle. The length of the mixing chamber is thus chosen to provide the optimum performance regarding momentum transfer and to enhance turbulence. In some embodiments the length may be adjustable in situ rather than pre-designed in order to provide a measure of versatility.

The mixing chamber geometry is determined by the desired and projected output performance of the discharge of mist and to match the designed steam conditions and nozzle geometry. In this respect it will be appreciated that there is a combinatory effect as between the various geometric features and their effect on performance, namely droplet size, droplet density, mist spray cone angle and projected distance.

The inlet 4 is formed at a front end of a protrusion 6 extending into the housing 2 and defining exteriorly thereof a chamber or plenum 8 for the introduction of a transport fluid into the mixing chamber 3A, the plenum 8 being provided with a transport fluid feed port 10. The protrusion 6 defines internally thereof part of the passage 3.

The transport fluid is steam, but may be any compressible fluid, such as a gas or vapour, or may be a mixture of compressible and flowable fluids. It is envisaged that to allow a quick start to the mist generator 1, the transport fluid can initially be air. Meanwhile, a rapid steam generator or other means can be used to generate steam. Once the steam is formed, the air supply can be switched to the steam supply. It is also envisaged that air or other compressible fluids and/or flowable fluids can be used to regulate the temperature of the transport fluid, which in turn can be used to control the mist droplet formation.

A distal end 12 of the protrusion 6 remote from the inlet 4 is tapered on its relatively outer surface 14 and defines a transport nozzle 16 between it and a correspondingly tapered part 18 of the inner wall of the housing 2, the transport nozzle 16 being in fluid communication with the plenum 8.

The transport nozzle 16 is so shaped (with a convergent-divergent portion) as in use to give supersonic flow of the transport fluid into the mixing chamber 3A. For a given steam condition, i.e. dryness (quality), pressure, velocity and temperature, the transport nozzle 16 is preferably configured to provide the highest velocity steam jet, the lowest pressure drop and the highest enthalpy between the plenum and nozzle exit. However, it is envisaged that the flow of transport fluid into the mixing chamber may alternatively be sub-sonic in some applications for application or process requirements, or transport fluid and/or working fluid property requirements. For instance, the jet issuing from a sub-sonic flow will be easier to divert compared with a supersonic jet.

Accordingly, a transport nozzle could be adapted with deflectors to give a wider cone angle than supersonic flow conditions. However, whilst sub-sonic flow may provide a wider spray cone angle, there is a trade-off with an increase in the mist's droplet size; but in some applications this may be acceptable.

Thus, the transport nozzle 16 corresponds with the shape of the passage 3, for example, a circular passage would advantageously be provided with an annular nozzle circumscribing the said passage.

It is anticipated that the transport nozzle 16 may be a single point nozzle which is located at some point around the circumference of the passage to introduce transport fluid into the mixing chamber. However, an annular configuration will be more effective compared with a single point nozzle.

The term "annular" as used herein is deemed to embrace any configuration of nozzle or nozzles that circumscribes the passage 3 of the mist generator 1, and encompasses circular, irregular, polygonal, elliptical and rectilinear shapes of nozzle.

In the case of a rectilinear passage, which may have a large width to height ratio, transport nozzles would be provided at least on each transverse wall, but not necessarily on the sidewalls, although the invention optionally contemplates a full circumscription of the passage by the nozzles irrespective of shape. For example the mist generator could be made to fit a standard door letterbox to allow fire fighters to easily treat a house fire without the need to enter the building. Size scaling is important in terms of being able to readily accommodate differing designed capacities in contrast to conventional equipment.

The transport nozzle 16 has an area ratio, defined as exit area to throat area, in the range 1.75 to 15 with an included angle ($\alpha$) substantially equal to or less than 6 degrees for supersonic flow, and substantially equal to or less than 12 degrees for sub-sonic flow; although the included angle ($\alpha$) may be greater. The angular orientation of the transport nozzle 16 is $\beta$=0 to 30 degrees relative to the boundary flow of fluid within the conduit at the nozzle's exit. However, the angle $\beta$ may be greater.

The transport nozzle 16 may, depending on the application of the mist generator 1, have an irregular cross section. For example, there may be an outer circular nozzle having an inner ellipsoid or elliptical nozzle which both can be configured to provide particular flow patterns, such as swirl, in the mixing chamber to increase the intensity of the shearing effect and turbulence.

A working nozzle 34, located downstream of the transport nozzle 16 nearer to the exit 5, is formed in a second plenum 32 provided in the housing 2.

The working nozzle 34 is annular and circumscribes the passage 3.

The working nozzle 34 corresponds with the shape of the passage 3 and/or the transport nozzle 16 and thus, for example, a circular passage would advantageously be provided with an annular working nozzle circumscribing said passage. However, it is to be appreciated that the working nozzle 34 need not be annular, or indeed, need not be a nozzle. The working nozzle 34 need only be an inlet to allow a working fluid to be introduced into the mixing chamber 3A.

In the case of a rectilinear passage, which may have a large width to height ratio, working nozzles would be provided at least on each transverse wall, but not necessarily on the sidewalls, although the invention optionally contemplates a full circumscription of the passage by the working nozzle irrespective of shape.

The working nozzle 34 may be used for the introduction of gases or liquids or of other additives that may, for example, be treatment substances for the working fluid or may be particulates in powder or pulverant form to be mixed with the working fluid. For example, water and an additive may be introduced together via a working nozzle (or separately via two working nozzles) for water mist applications. The working fluid and additive are entrained into the mist generator 1 by the low pressure created within the mist generator (mixing chamber). The fluids or additives may also be pressurised by an external means and pumped into the mist generator, if required.

For fire fighting applications, typically the working fluid is water, but may be any flowable fluid or mixture of flowable fluids requiring to be dispersed into a mist, e.g. any non-flammable liquid or flowable fluid (inert gas) which absorbs heat when it vaporises may be used instead of, or in addition to via a second working nozzle, the water.

The working nozzle 34 may be located as close as possible to the projected surface of the transport fluid issuing from the transport nozzle 16. In practice and in this respect a knife edge separation between the transport fluid stream and the working fluid stream issuing from their respective nozzles may be of advantage in order to achieve the requisite degree of interaction of said fluids. The angular orientation of the transport nozzle 16 with respect to the stream of the working fluid is of importance.

The transport nozzle 16 is conveniently angled towards the stream of working fluid issuing from the working nozzle 34 since this occasions penetration of the working fluid. The angular orientation of both nozzles is selected for optimum performance to enhance turbulence, which is dependent inter alia on the nozzle orientation and the internal geometry of the mixing chamber, to achieve a desired droplet formation (i.e. size, distribution, spray cone angle and projection). Moreover, the creation of turbulence, governed inter alia by the angular orientation of the nozzles, is important to achieve optimum performance by dispersal of the working fluid in order to increase acceleration by momentum transfer and mass transfer.

Simply put, the more turbulence there is generated, the smaller the droplet size achievable.

FIGS. 2 to 4 show schematics of different configurations of the transport and working nozzles, which provide different degrees of turbulence.

FIG. 2 shows an over expanded transport nozzle. The transport nozzle can be configured to provide a particular steam pressure gradient across it. One parameter that can be changed/controlled is the degree of expansion of the steam through the nozzle. Different steam exit pressures provide different steam exit velocities and temperatures with a subsequent effect on the droplet formation of the mist.

With an over expanded nozzle the steam exiting the transport nozzle is over expanded such that its local pressure is less than local atmospheric pressure. For example, typical pressures are 0.7 to 0.8 bar absolute, with a subsequent steam temperature of approximately 85° C.

This results in the formation of very weak shocks B and a possible weak expansion wave C in the flow. The advantages of this arrangement is that the steam velocity is high, therefore there is a very high primary and secondary break up, which results in relatively smaller droplets. It can also be quieter in operation than other nozzle arrangements (as will be discussed), due to the lack of strong shocks.

There is a trade-off though in that there is reduced suction pressure created within the mist generator due to the lack of condensation shocks. However, this feature is only desired to entrain the inlet or working fluid through the mist generator rather than pumping it in.

Figure 3:
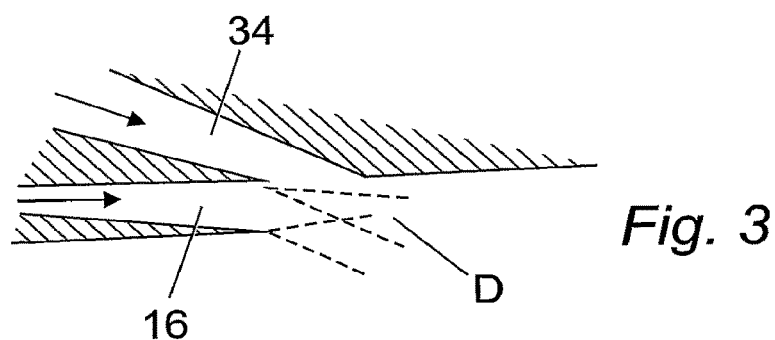
Figure 4:
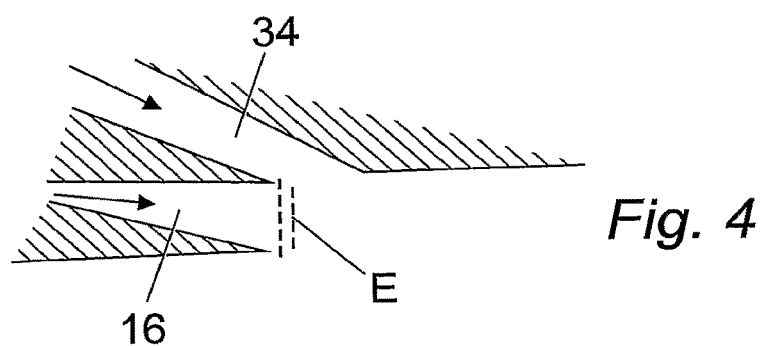
Figure 5:
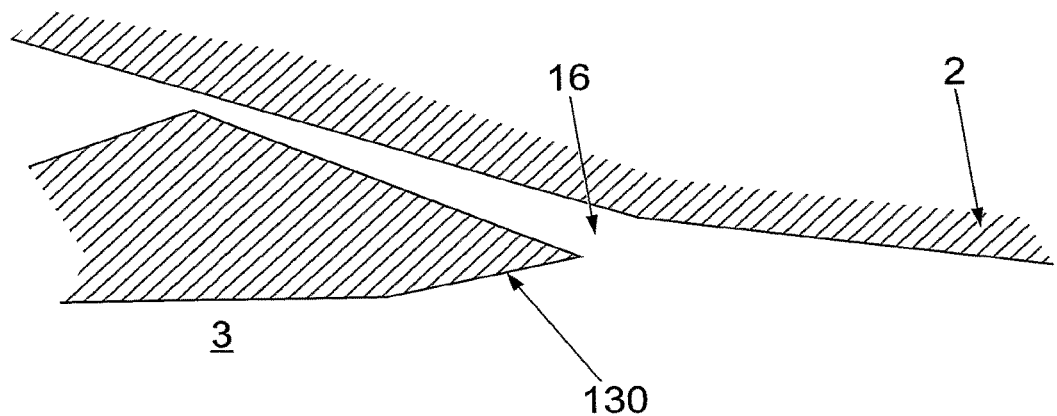

FIG. 3 shows an under expanded transport nozzle. With under expanded nozzles the exit steam pressure is higher than local atmospheric pressure, for example it can be approximately 1.2 bar absolute, at a temperature of approximately 115° C. This results in local expansion and condensation shocks D. A higher temperature differential between the steam and water can exist, therefore local condensation shocks are generated. This results in a higher suction pressure being generated through the mist generator for the entrainment of the working fluid and inlet fluid.

However, there is a trade-off in that an under expanded nozzle has a lower steam velocity, resulting in a less efficient primary and secondary break up, leading to slightly larger droplet sizes.

FIG. 4 shows a largely over expanded transport nozzle. This alternative arrangement has a typical exit pressure of approximately 0.2 bar absolute. However, the exit velocity can be very high, typically approximately 1500 m/s (approximately Mach 3). This high velocity results in the generation of a very strong localised aerodynamic shock E (normal shock) at the steam exit. This shock is so strong that theoretically downstream of the shock the pressure increases to approximately 1.2 bar absolute and rises to a temperature of approximately 120° C. This higher temperature may help to reduce the surface tension of the water, so helping to reduce the droplet size. This resultant higher temperature can be used in applications where heat treatment of the working and/or inlet fluid is required, such as the treatment of bacteria.

However, the trade-off with this arrangement is that the strong shocks reduce the velocity of the steam, therefore there is a reduced effect on the high shear droplet break up mechanism. In addition, it may be noisy.

In operation the inlet 4 is connected to a source of inlet fluid which is introduced into the inlet 4 and passage 3. In this specific example relating to fire suppression, the inlet fluid is air, but may by any flowable fluid or mixture of flowable fluids.

The working fluid, water, is introduced into a feed port 30, where the water flows into the plenum 32, and out through the working nozzle 34.

However, it is anticipated that working fluid may be introduced into the mixing chamber via the inlet 4, where a second working fluid may be introduced into the mixing chamber via a working nozzle.

The transport fluid, steam, is introduced into the feed port 10, where the steam flows into the plenum 8, and out through the transport nozzle 16 as a high velocity steam jet.

The high velocity steam jet issuing from the transport nozzle 16 impacts with the water stream issuing from the nozzle 34 with high shear forces, thus atomising the water breaking it into fine droplets and producing a well mixed three-phase condition constituted by the liquid phase of the water, the steam and the air. In this instance, the energy transfer mechanism of momentum and mass transfer occasion's induction of the water through the mixing chamber 3A and out of the exit 5. Mass transfer will generally only occur for hot transport fluids, such as steam.

In simple terms, the present invention uses the transport fluid to slice up the working fluid. As already touched on, the more turbulence you have, the smaller the droplets formed.

The present invention has a primary break up mechanism and a secondary break up mechanism to atomise the working fluid. The primary mechanism is the high shear between the steam and the water, which is a function of the high relative velocities between the two fluids, resulting in the formation of small waves on the boundary surface of the water surface, ultimately forming ligaments which are stripped off.

The secondary break up mechanism involves two aspects. The first is further shear break up, which is a function of any remaining slip velocities between the water and the steam. However, this reduces as the water ligaments/droplets are accelerated up to the velocity of the steam. The second aspect is turbulent eddie break up of the water droplets caused by the turbulence of the steam. The turbulent eddie break up is a function of transport nozzle exit velocities, local turbulence, nozzle orientation (this effects the way the mist interacts with itself), and the surface tension of the water (which is effected by the temperature).

The primary break up mechanism of the working fluid may be enhanced by creating initial instabilities in the working fluid flow. Deliberately created instabilities in the transport fluid/working fluid interaction layer encourages fluid surface turbulent dissipation resulting in the working fluid dispersing into a liquid-ligament region, followed by a ligament-droplet region where the ligaments and droplets are still subject to disintegration due to aerodynamic characteristics.

The interaction between the transport fluid and the working fluid, leading to the atomisation of the working fluid, is enhanced by flow instability. Instability enhances the droplet stripping from the contact surface of the flow of the working fluid. A turbulent dissipation layer between the transport and working fluids is both fluidically and mechanically (geometry) encouraged ensuring rapid fluid dissipation.

The internal walls of the flow passage immediately upstream of the transport nozzle 16 exit may be contoured to provide different degrees of turbulence to the working fluid prior to its interaction with the transport fluid issuing from the or each nozzle.

FIG. 5 shows the internal walls of the passage 3 provided with a contoured internal wall in the region 19 immediately upstream of the exit of the transport nozzle 16 is provided with a tapering wall 130 to provide a diverging profile leading up to the exit of the transport nozzle 16. The diverging wall geometry provides a deceleration of the localised flow, providing disruption to the boundary layer flow, in addition to an adverse pressure gradient, which in turn leads to the generation and propagation of turbulence in this part of the working fluid flow.

An alternative embodiment is shown in FIG. 6, which shows the internal wall 19 of the flow passage 3 immediately upstream of the transport nozzle 16 being provided with a diverging wall 130 on the bore surface leading up to the exit of the transport nozzle 16, but the taper is preceded with a step 132. In use, the step results in a sudden increase in the bore diameter prior to the tapered section. The step 'trips' the flow, leading to eddies and turbulent flow in the working fluid within the diverging section, immediately prior to its interaction with the steam issuing from the transport nozzle 16. These eddies enhance the initial wave instabilities which lead to ligament formation and rapid working fluid dispersion.

The tapered diverging section 130 could be tapered over a range of angles and may be parallel with the walls of the bore. It is even envisaged that the tapered section 130 may be tapered to provide a converging geometry, with the taper reducing to a diameter at its intersection with the transport nozzle 16 which is preferably not less than the bore diameter.

Figure 6:
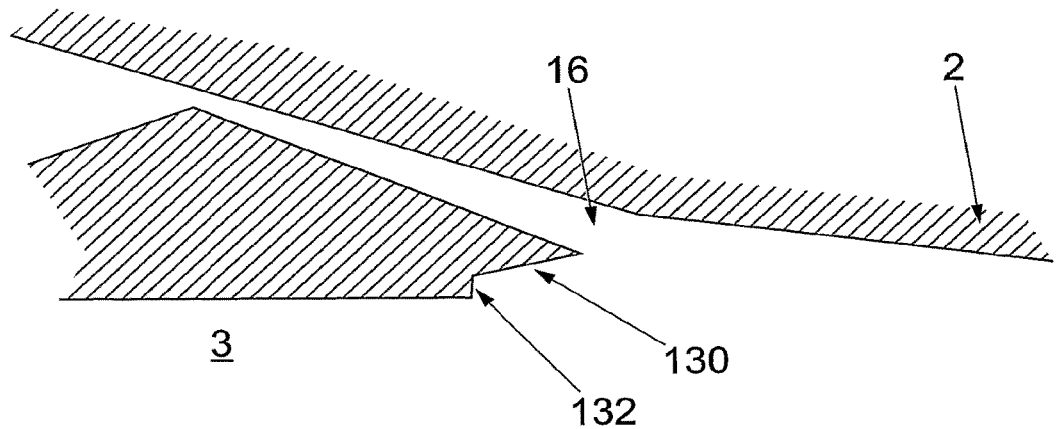
Figure 7:
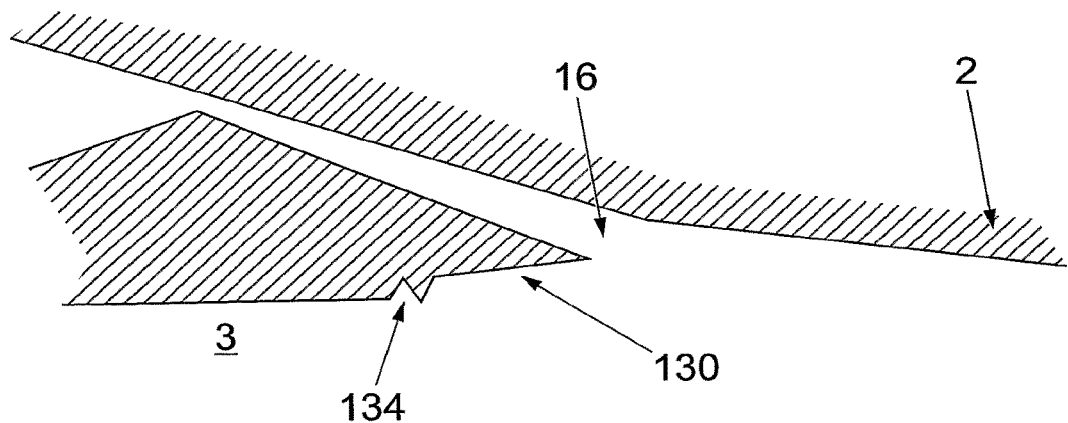
Figure 8:
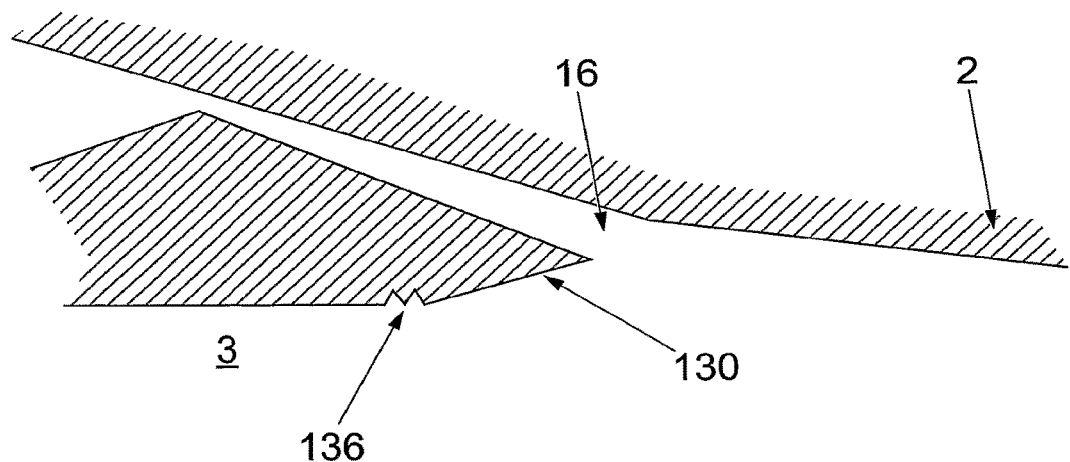
Figure 9:
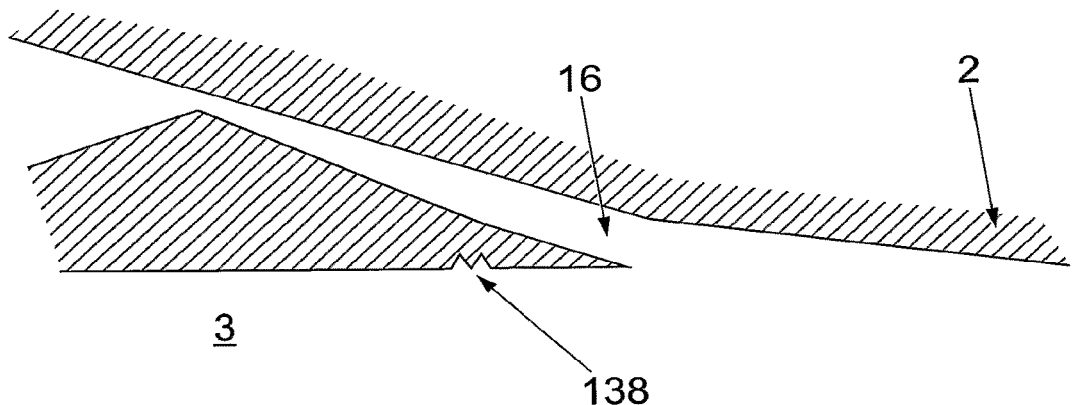
Figure 10:
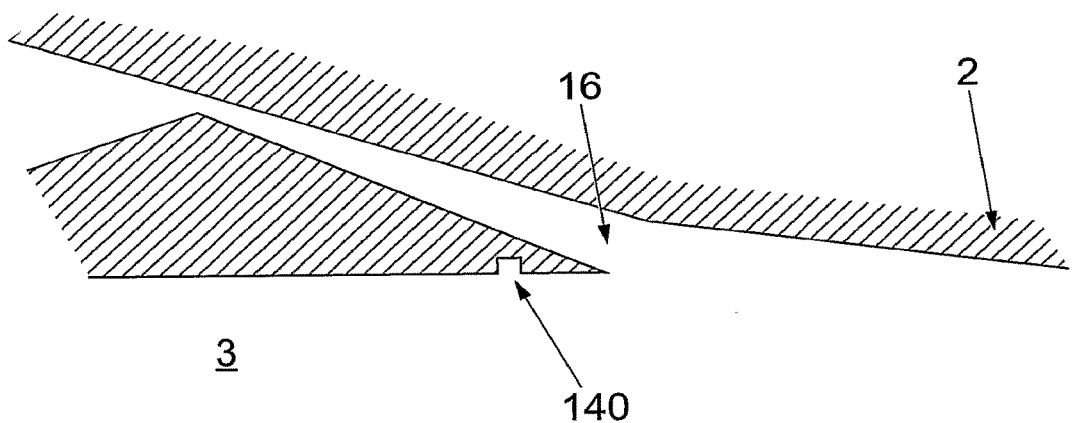

The embodiment shown in FIG. 6 is illustrated with the initial step 132 angled at 90° to the axis of the bore 3. As an alternative to this configuration, the angle of the step 132 may display a shallower or greater angle suitable to provide a 'trip' to the flow. Again, the diverging section 130 could be tapered at different angles and may even be parallel to the walls of the bore 3. Alternatively, the tapered section 130 may be tapered to provide a converging geometry, with the taper reducing to a diameter at its intersection with the transport nozzle 16 which is preferably not less than the bore diameter.

FIGS. 7 to 10 illustrate examples of alternative contoured profiles 134, 136, 138, 140. All of these are intended to create turbulence in the working fluid flow immediately prior to the interaction with the transport fluid issuing from the transport nozzle 16.

Although FIGS. 5 to 10 illustrate several combinations of grooves and tapering sections, it is envisaged that any combination of these features, or any other groove cross-sectional shape may be employed.

Similarly, the transport, working and supplementary nozzles, and the mixing chamber, may be adapted with such contours to enhance turbulence.

The length of the mixing chamber 3A can be used as a parameter to increase turbulence, and hence, decrease the droplet size, leading to an increased cooling rate.

Figure 11:
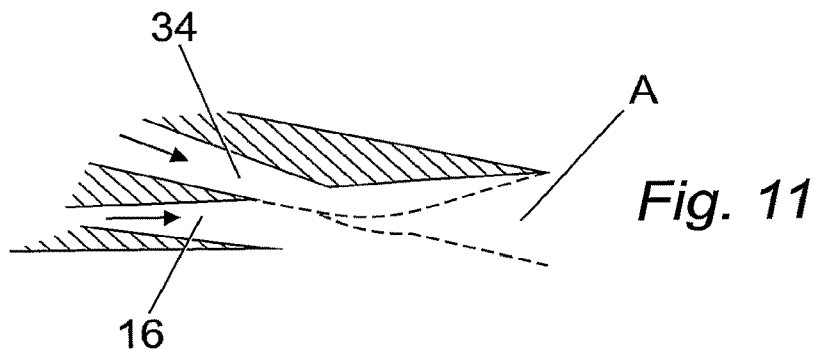
Figure 2:
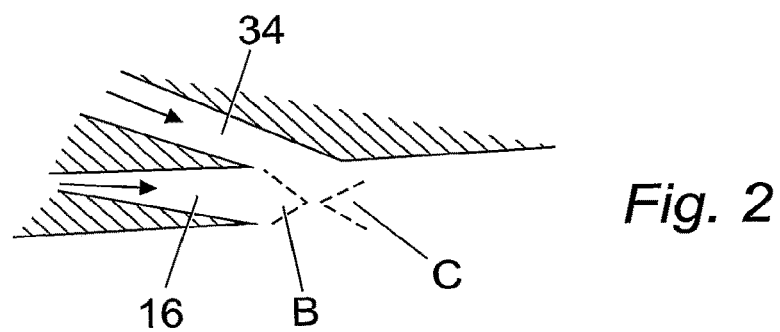

FIG. 11 shows a schematic of the interaction of the working and transport flows as they issue from their respective nozzles. Current thinking suggests that optimum performance is achieved when the length of the mixing chamber is limited to the point where the increasing thickness boundary layer A between the steam and the water touches the inner surface of the housing 2. Keeping the mixing chamber short like this also allows air to be entrained at the exit 5 from the outside surface of the mist generator, where the entrained air increases the mixing and turbulence intensity, and therefore, the mist's droplet formation. In other words, increased, intensity of the turbulence allows for the generation of smaller working fluid droplets within the mist. The advantage of having smaller water droplets is that they have a relatively increased cooling rate compared with larger droplet sizes.

The properties or parameters of the inlet fluid, working fluid and transport fluid, for example, quality, flow rate, velocity, pressure and temperature, can be regulated or controlled or manipulated to give the required intensity of shearing and hence, the required droplet size, droplet distribution, spray cone angle and projection distance. The properties of the inlet, working and transport fluids being controllable by either external means, such as a pressure regulation means, and/or by the angular orientation and internal geometry of the nozzles 16, 34.

The quality of the inlet and working fluids refer to its purity, viscosity, density, and the presence/absence of contaminants.

The mechanism of the present invention primarily relies on the momentum transfer between the transport fluid and the working fluid, which provides for shearing of the working fluid on a continuous basis by shear dispersion and/or dissociation, plus provides the driving force to propel the generated mist out of the exit. However, when the transport fluid is a hot compressible gas, for example steam, i.e. the transport fluid is of a higher temperature than the working fluid, it is thought that this mechanism is further enhanced with a degree of mass transfer between the transport fluid and the working fluid as well. Again, when the transport fluid is hotter than the working fluid the heat transfer between the fluids and the resulting increase in temperature of the working fluid further aids the dissociation of the liquid into smaller droplets by reducing the viscosity and surface tension of the liquid.

The intensity of the shearing mechanism, and therefore the size of the droplets created, and the propelling force of the mist, is controllable by manipulating the various parameters prevailing within the mist generator 1 when operational. Accordingly the flow rate, pressure, velocity, temperature and quality, e.g. in the case of steam the dryness, of the transport fluid, may be regulated to give a required intensity of shearing, which in turn leads to the mist emerging from the exit having a homogeneous working fluid droplet distribution having droplets which are of substantially uniform size, a substantial portion of which have a size less than 50 μm.

Similarly, the flow rate, pressure, velocity, quality and temperature of the fluids which make up the inlet and working fluids, which are either entrained into the mist generator by the mist generator itself (due to shocks and the momentum transfer between the transport and working fluids) or by external means, may be regulated to give the required intensity of shearing and desired droplet size.

In carrying out the method of the present invention the creation and intensity of the dispersed droplet flow is occasioned by the design of the transport nozzle 16 interacting with the setting of the desired parametric conditions, for example, in the case of steam as the transport fluid, the pressure, the dryness or steam quality, the velocity, the temperature and the flow rate, to achieve the required performance of the transport nozzle, i.e. generation of a water mist with a substantially uniform droplet distribution, a substantial portion of which have a size less than 50 μm.

The performance of the present invention can be complimented with the choice of materials from which it is constructed. Although the chosen materials have to be suitable for the temperature, steam pressure and working fluid, there are no other restrictions on choice. For example, high temperature composites, stainless steel, or aluminium could be used.

The nozzles may advantageously have a surface coating. This will help reduce wear of the nozzles, and avoid any build up of agglomerates/deposits therein, amongst other advantages.

The nozzles 16, 34 may be continuous (annular) or may be discontinuous in the form of a plurality of apertures, e.g. segmental, arranged in a circumscribing pattern that may be circular. In either case each aperture may be provided with substantially helical or spiral vanes formed in order to give in practice a swirl to the flow of the transport fluid and working fluid respectively. Alternatively swirl my be induced by introducing the transport/working fluid into the mist generator in such a manner that the transport/working fluid flow induces a swirling motion in to and out of each nozzle 16, 34. For example, in the case of an annular transport nozzle, and with steam as the transport fluid, the steam may be introduced via a tangential inlet off-centre of the axial plane, thereby inducing swirl in the plenum before passing through the transport nozzle. The same would apply to an annular working nozzle where the working fluid would induce a swirl before passing through the working nozzle. As a further alternative the transport and working nozzles may circumscribe the passage in the form of a continuous substantially helical or spiral scroll over a length of the passage, the nozzle apertures being formed in the wall of the passage.

Whilst the nozzles 16, 34 are shown in FIG. 1 as being directed towards the exit 5, it is also envisaged that the working nozzle 34 may be directed/angled towards the inlet 4, which may result in greater turbulence. Also, the working nozzle 34 may be provided at any angle up to 180 degrees relative to the transport nozzle in order to produce greater turbulence by virtue of the higher shear associated with the increasing slip velocities between the transport and working fluids. For example, the working nozzle may be provided perpendicular to the transport nozzle.

In some embodiments of the present invention a series of transport nozzles is provided lengthwise of the passage 3 and the geometry of the nozzles may vary from one to the other dependent upon the effect desired. For example, the angular orientation may vary one to the other. The nozzles may have differing geometries to afford different effects, i.e. different performance characteristics, with possibly differing parametric transport conditions. For example some nozzles may be operated for the purpose of initial mixing of different liquids and gasses whereas other nozzles are used simultaneously for additional droplet break up or flow directionalisation. Each nozzle may have a mixing chamber section downstream thereof. In the case where a series of nozzles is provided, the number of transport nozzles and working nozzles is optional.

A cowl (not shown) may be provided downstream of the exit 5 from the passage 3 in order to further control the mist. The cowl may comprise a number of separate sections arranged in the radial direction, each section controlling and re-directing a portion of the mist spray emerging from the exit 5 of the mist generator 1.

Figure 12:
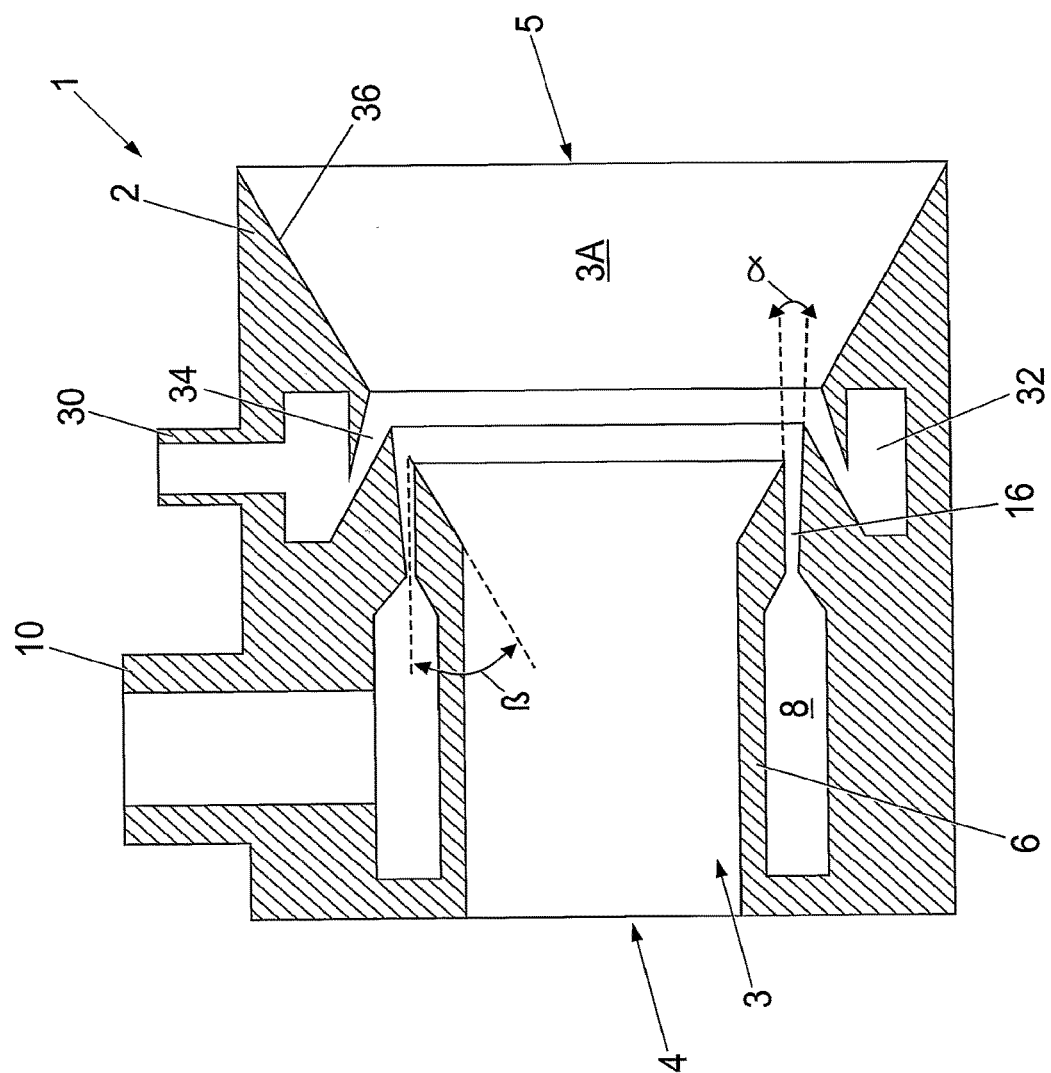

FIG. 12 shows an embodiment of the present invention substantially similar to that shown in FIG. 1 save that the mist generator 1 is provided with a diverging mixing chamber section 3A, and the angular orientation (β) of the nozzles 16, 34 have been adjusted and angled to provide the desired interaction between the steam (transport fluid) and the water (working fluid) occasioning the optimum energy transfer by momentum and mass transfer to enhance turbulence.

This embodiment operates in substantially the same way as previous embodiments save that this embodiment provides a more diffuse or wider spray cone angle and therefore a wider discharge of mist coverage. Angled walls 36 of the mixing chamber 3A may be angled at different divergent and convergent angles to provide different spray cone angles and a wider discharge of mist coverage.

Figure 13:
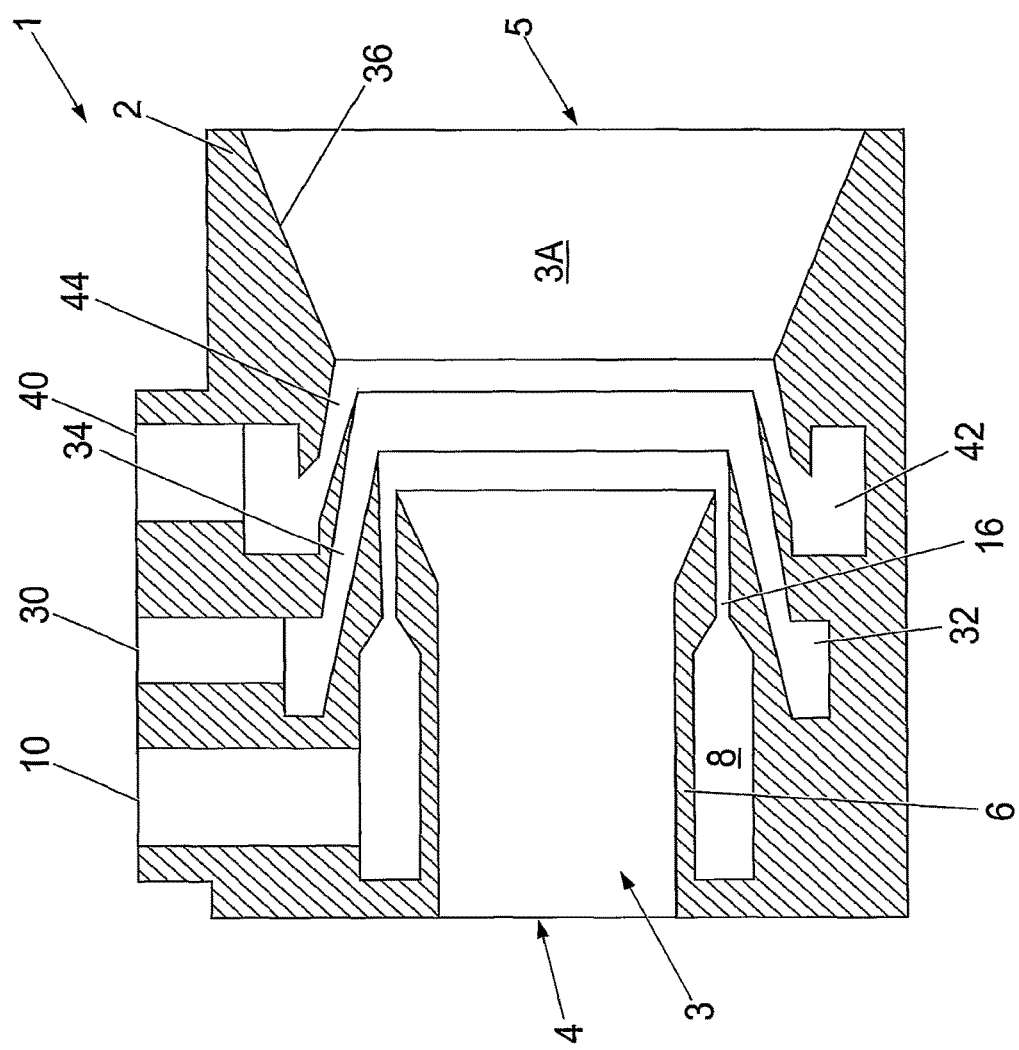

Referring now to FIG. 13, which shows an embodiment of the present invention substantially similar to that illustrated in FIG. 12 save that an additional transport fluid feed port 40 and plenum 42 are provided in housing 2, together with a second transport nozzle 44 formed at a location downstream of the working nozzle 34 nearer to the exit 5.

The second transport nozzle 44 is used to introduce the transport fluid (steam) into the mixing chamber 3A downstream of the working fluid (water). The second transport nozzle may be used to introduce a second transport fluid.

In this embodiment the three nozzles 16, 34, 44 are located coincident with one another thus providing a co-annular nozzle arrangement.

This embodiment is provided with a diverging mixing chamber section 3A and the angles of the nozzles 16, 34, 44 are angled to provide the desired angles of interaction between the two streams of steam and the water, thus occasioning the optimum energy transfer by momentum and mass transfer to enhance turbulence.

The diverging walls 36 of the mixing chamber provide a more diffuse or wider spray cone angle and therefore a wider discharge of mist coverage. The angle of the walls 36 of the mixing chamber 3A may be varied convergent-divergent to provide different spray cone angles.

In operation two high velocity streams of steam exit their respective transport nozzles 16, 44, and sandwich the water stream issuing from the working nozzle 34. This embodiment both enhances the droplet formation by providing a double shearing action, and also provides a fluid separation or cushion between the water and the walls 36 of the mixing chamber 3A, thus preventing small water droplets being lost through coalescence on the angled walls 36 of the mixing chamber 3A before exiting the mist generator 1 via the exit 5. In alternative embodiments, not shown, the mixing chamber section 3A may be converging. This will provide a greater exit velocity for the discharge of mist and therefore a greater projection range.

Figure 14:
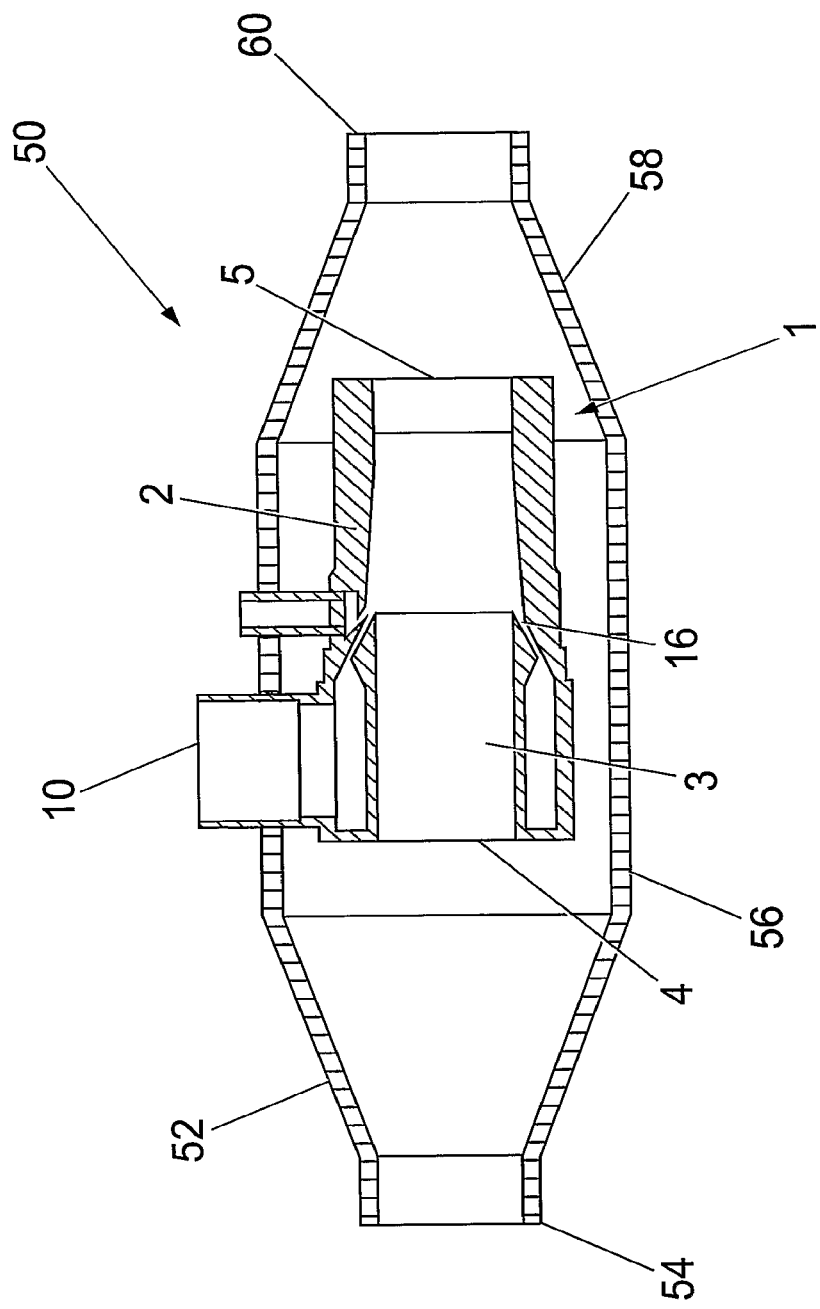

With reference to FIG. 14, the mist generator 1 of FIG. 1 is disposed centrally within a cowl or casing 50. The casing 50 comprises a diverging inlet portion 52 having an inlet opening 54, a central portion 56 of constant cross-section, leading to a converging outlet portion 58, the outlet portion 58 having an outlet opening 60.

In use the inlet opening 54 and the outlet opening 60 are in fluid communication with a body of the inlet fluid (air) either therewithin or connected to a conduit. Although FIG. 14 illustrates use of the mist generator 1 of FIG. 1 disposed centrally within the casing 50, it is envisaged that any of the embodiments of the present invention may also be used instead.

In operation the inlet fluid (air) is drawn through the casing 50 (by shocks and momentum transfer), or is pumped in by external means, with flow being induced around the housing 2 and also through the passage 3 of the mist generator 1.

The convergent portion 58 of the casing 50 provides a means of enhancing a momentum transfer (suction) in mixing between the flow exiting the mist generator 1 at exit 5 and the fluid drawn through the casing 50. The enhanced suction and mixing of the mist with the fluid drawn through the casing 50 could be used in such applications as gas cooling, decontamination and gas scrubbing.

As an alternative to this specific configuration shown in FIG. 14, inlet portion 52 may display a shallow angle or indeed may be dimensionally coincident with the bore of the central portion 56. The outlet portion 58 may be of varied shape which has different accelerative and mixing performance on the spray cone angle and projection range on the discharge of mist.

Figure 15:
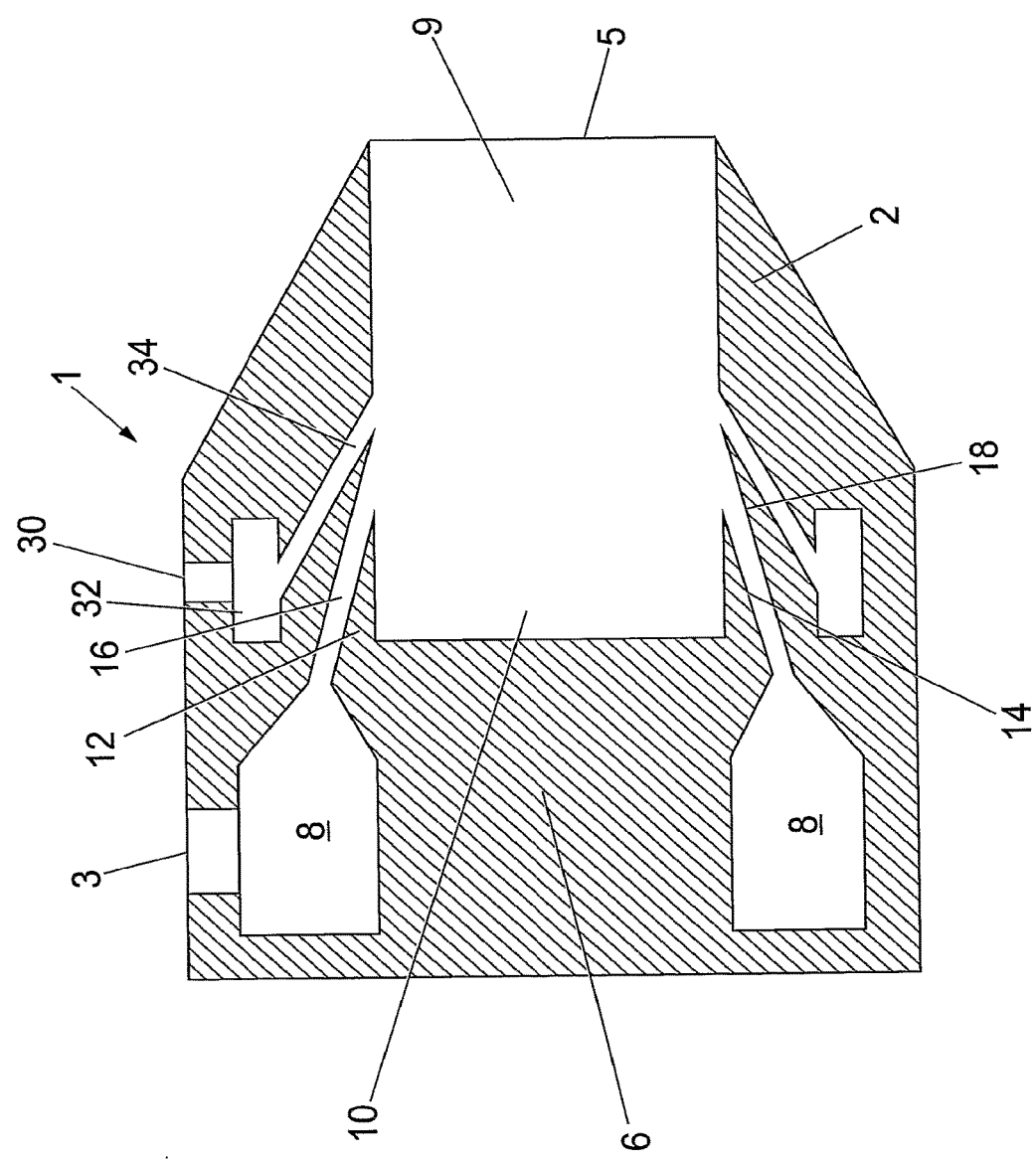

In a further embodiment of the present invention, as shown in FIG. 15, there is no straight-through passage 3 as with previous embodiments. Thus there is no requirement for the introduction of the inlet fluid (air).

In this embodiment the apparatus for generating a mist (mist generator 1) comprises a conduit or housing 2, providing a mixing chamber 9, a transport fluid inlet 3, a working fluid inlet 4 and an outlet or exit 5.

The transport fluid inlet 3 has an annular chamber or plenum 8 provided in the housing 2, the inlet 3 also has a transport nozzle 16 for the introduction of a transport fluid into the mixing chamber 9.

A protrusion 6 extends into the housing 2 and defines a plenum 8 for the introduction of the transport fluid into the mixing chamber 9 via the transport nozzle 16.

A distal end 12 of the protrusion 6 is tapered on its relatively outer surface 14 and defines the transport nozzle 16 between it and a correspondingly tapered part 18 of the housing 2.

The working fluid inlet 30 has a plenum 32 provided in the housing 2, the working fluid inlet 30 also has a working nozzle 34 formed at a location coincident with that of the transport nozzle 16.

The transport nozzle 16 and working nozzle 34 are substantially similar to that of previous embodiments.

In operation the working fluid inlet 30 is connected to a source of working fluid, water. The transport fluid inlet 3 is connected to a source of transport fluid, steam. Introduction of the steam into the inlet 3, through the plenum 8, causes a jet of steam to issue forth through the transport nozzle 16. The parametric characteristics or properties of the steam, for example, pressure, temperature, dryness (quality), etc., are selected whereby in use the steam issues from the transport nozzle 16 at supersonic speeds into a mixing region of the chamber 10, hereinafter described as the mixing chamber 9. The steam jet issuing from the transport nozzle 16 impacts the working fluid issuing from the working nozzle 34 with high shear forces, thus atomising the water into droplets and occasioning induction of the resulting water mist through the mixing chamber 9 towards the exit 5.

The parametric characteristics, i.e. the internal geometries of the nozzles 16, 34 and their angular orientation, the cross-section and length of the mixing chamber, and the properties of the working and transport fluids are modulated/manipulated to discharge a water mist with a substantially uniform droplet distribution having a substantial portion of droplets with a size less than 50 µm.

Figure 16:
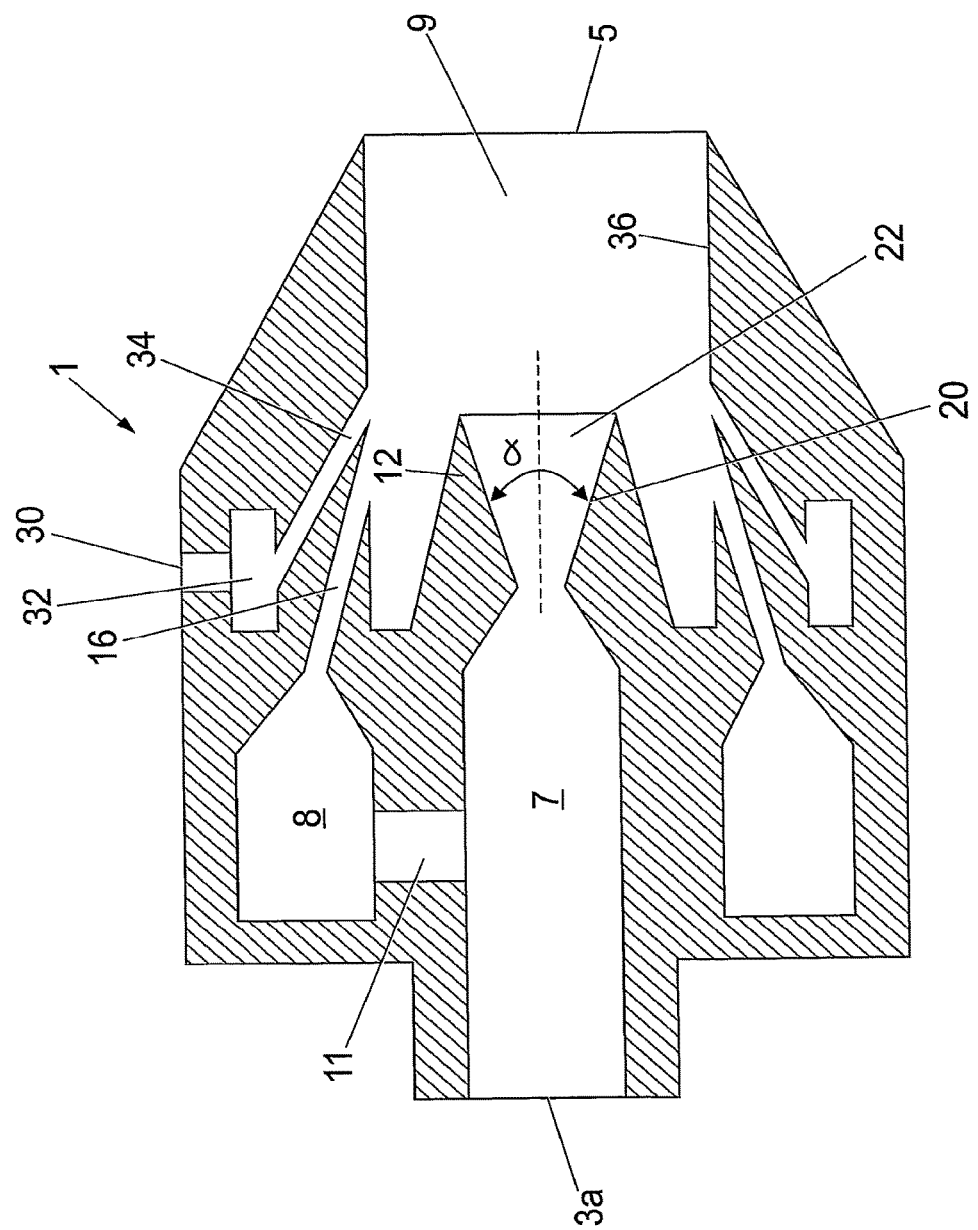

FIG. 16 shows yet a further embodiment of the present invention similar to that illustrated in FIG. 15 save that the protrusion 6 incorporates a supplementary nozzle 22, which is axial to the longitudinal axis of the housing 2 and which is in fluid communication with the mixing chamber 9. An inlet 3a is formed at a front end of the protrusion 6 (distal from the exit 5) extending into the housing 2 incorporating interiorly thereof a plenum 7 for the introduction of the transport fluid, steam. The plenum 7 is in fluid communication with the plenum 8 through one or more channels 11.

A distal end 12 of the protrusion 6 remote from the inlet 3A is tapered on its internal surface 20 and defines a parallel axis aligned supplementary nozzle 22, the supplementary nozzle 22 being in fluid communication with the plenum 7.

The supplementary nozzle 22 is so shaped as in use to give supersonic flow of the transport fluid into the mixing chamber 9. For a given steam condition, i.e. dryness (quality), pressure and temperature, the nozzle 22 is preferably configured to provide the highest velocity steam jet, the lowest pressure drop and the highest enthalpy between the plenum and the transport nozzle exit. However, it is envisaged that the flow of transport fluid into the mixing chamber may alternatively be sub-sonic in some applications as hereinbefore described.

The supplementary nozzle 22 has an area ratio in the range 1.75 to 15 with an included angle ($\alpha$) less than 6 degrees for supersonic flow, and 12 degrees for sub-sonic flow; although ($\alpha$) may be higher.

It is to be appreciated that the supplementary nozzle 22 is angled to provide the desired interaction between the transport and working fluid occasioning the optimum energy transfer by momentum and mass transfer to obtain the required intensity of shearing suitable for the required droplet size. The supplementary nozzle 22 as shown in FIG. 16 may be located off-centre and/or may be tilted.

In operation the working fluid inlet 30 is connected to a source of the working fluid to be dispersed, water. The fluid inlet 3a is connected to a source of transport fluid, steam. Introduction of the steam into the inlet 3a, through the plenums 7, 8 causes a jet of steam to issue forth through the transport nozzle 16 and the supplementary nozzle 22. The parametric characteristics or properties of the steam are selected whereby in use the steam issues from the nozzles at supersonic speeds into the mixing chamber 9. The steam jets issuing from the nozzles 16, 22 impact the working fluid issuing from the working nozzle 34 with high shear forces, thus atomising the water into droplets and occasioning induction of the resulting water mist through the mixing chamber 9 towards the exit 5.

The parametric characteristics, i.e. the internal geometries of the nozzles 16, 34 and their angular orientation, the cross-section (and length) of the mixing chamber, and the properties of the working and transport fluids are modulated/manipulated to discharge a water mist with a substantially uniform droplet distribution having a substantial portion of droplets with a size less than 50 µm.

It is to be appreciated that the supplementary nozzle 22 will increase the turbulent break up, and also influence the shape of the emerging mist plume.

The supplementary nozzle 22 may be incorporated into any other embodiment of the present invention.

Figure 17:
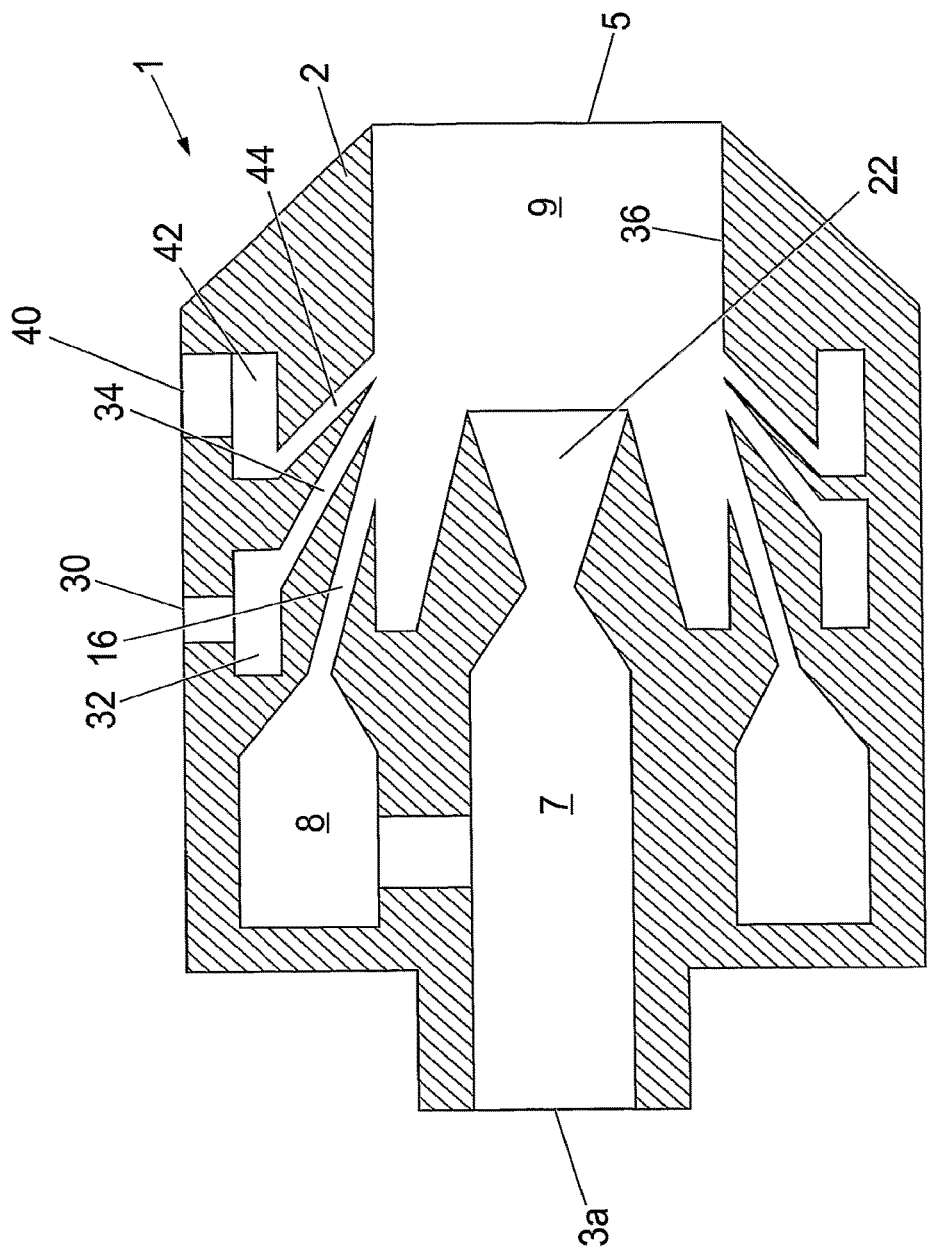

FIG. 17 shows an embodiment substantially similar to that illustrated in FIG. 16 save that an additional transport fluid inlet 40 and plenum 42 are provided in the housing 2, together with a second transport nozzle 44 formed at a location coincident with that of the working nozzle 34, thus providing a co-annular nozzle arrangement.

The transport nozzles 16, 44, the supplementary nozzle 22 and the working nozzle 34 are angled to provide the desired angles of interaction between the steam and water, and optimum energy transfer by momentum and mass transfer to enhance turbulence.

In operation the high velocity steam jets issuing from the nozzles 16, 22, 44 impact the water with high shear forces, thus breaking the water into fine droplets and producing a well mixed two phase condition constituted by the liquid phase of the water and the steam. This both enhances the droplet formation by providing a double shearing action, and also provides a fluid separation or cushion between the water and the internal walls 36 of the mixing chamber 9. This prevents small water droplets being lost through coalescence on the internal walls 36 of the mixing chamber 9 before exiting the mist generator 1 via the outlet 5. Additionally the nozzles 16, 22, 44 are angled and shaped to provide the desired droplet formation. In this instance, the energy transfer mechanism of momentum and mass transfer occasion's projection of the spray mist through the mixing chamber 9 and out of the exit 5.

Figure 18:
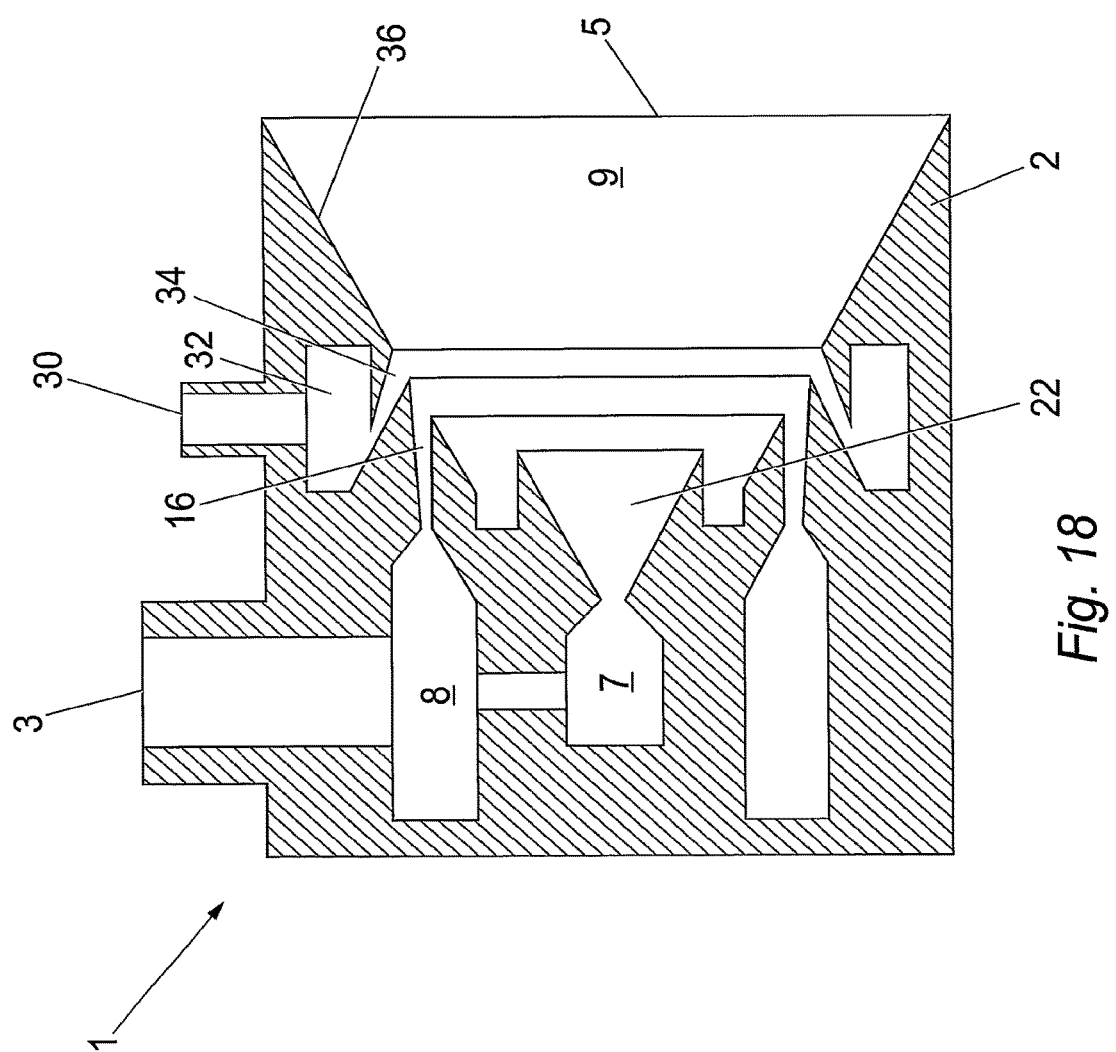

FIG. 18 shows an embodiment substantially similar to that illustrated in FIG. 16 save that it is provided with a diverging mixing chamber 9 and a radial transport fluid inlet 3 rather than the parallel axis inlet 3a shown in FIG. 16. However, either inlet type may be used.

The transport nozzle 16, the supplementary nozzle 22 and the working nozzle 34 are angled to provide the desired angles of interaction between the transport and the working fluid occasioning the optimum energy transfer by momentum and mass transfer to enhance turbulence.

The arrangement illustrated provides a more diffuse or wider spray cone angle and therefore a wider mist coverage. The angle of the internal walls 36 of the mixing chamber 9 relative to a longitudinal centreline of the mist generator 1, and the angles of the nozzles 16, 22, 34 relative to the walls 36, may be varied to provide different droplet sizes, droplet distributions, spray cone angles and projection ranges. In an alternative embodiment, not shown, the mixing chamber 9 may be converging. This will provide a narrow concentrated mist spray, and may provide a greater axial velocity for the mist and therefore a greater projection range.

Figure 19:
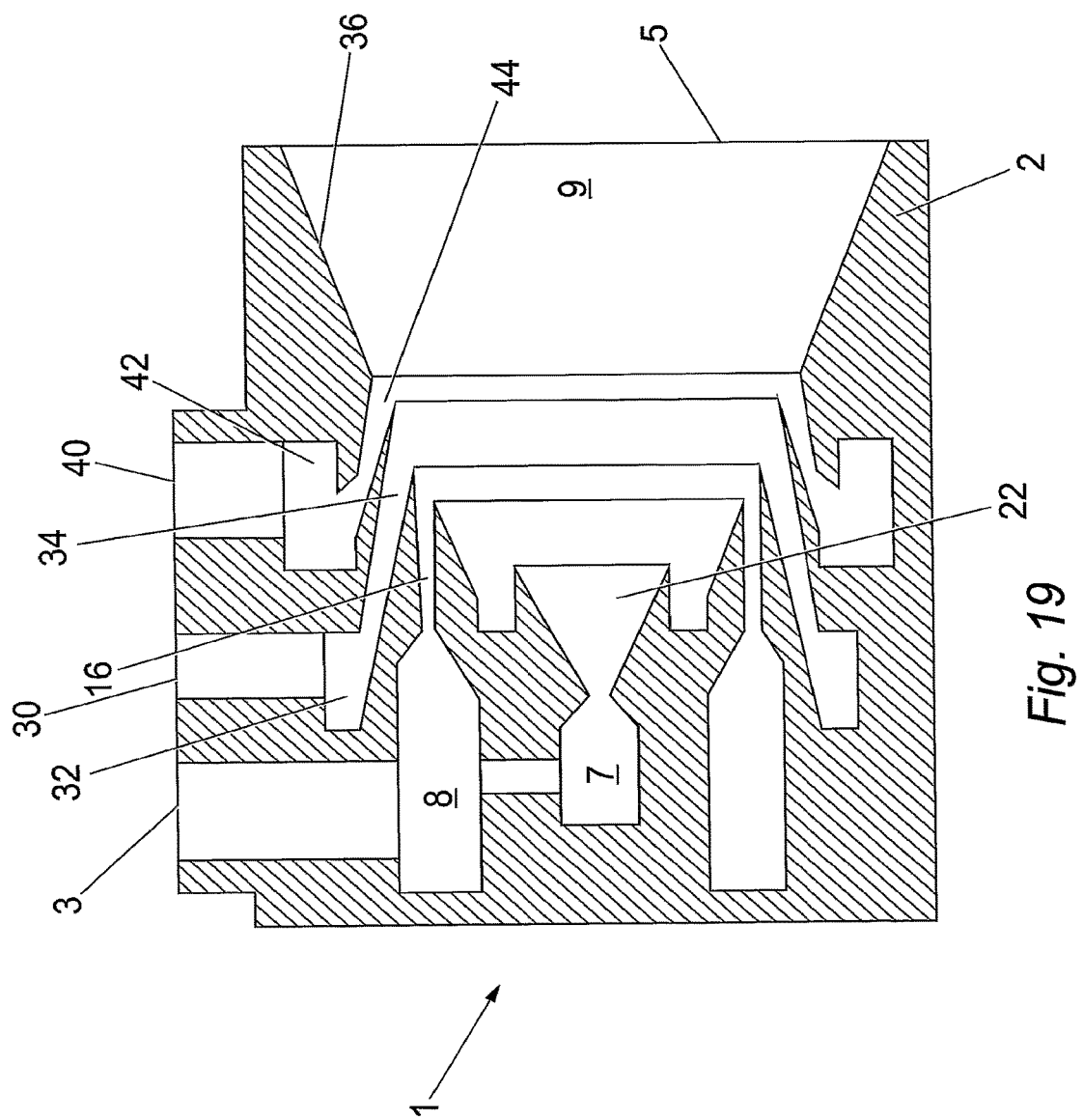

FIG. 19 shows a further embodiment of the present invention substantially similar to the embodiment illustrated in FIG. 18 save that an additional transport fluid inlet 40 and plenum 42 are provided in the housing 2, together with a second transport nozzle 44 formed at a location coincident with that of the working nozzle 34, thus providing a co-annular nozzle arrangement.

This embodiment is provided with a diverging mixing chamber section 9 and the nozzles 16, 22, 34, 44 are also angled to provide the desired angles of interaction between the transport and working fluid, thus occasioning the optimum energy transfer by momentum and mass transfer to enhance turbulence.

The arrangement illustrated provides a more diffuse or wider spray cone angle and therefore a wider mist coverage. The angle of the inner walls 36 of the mixing chamber 9 relative to the longitudinal centreline of the mist generator 1, and the angles of the nozzles 16, 22, 34, 44 relative to the walls 36, may be varied to provide different droplet sizes, droplet distributions, spray cone angles and projection ranges. In an alternative embodiment, not shown, the mixing chamber 9 may be converging. This will provide a narrow concentrated mist spray, and may provide a greater axial velocity for the mist and therefore a greater projection range.

In operation the high velocity streams of steam exiting their respective nozzles 16, 22, 44, sandwich the water stream exiting the working nozzle 34. This both enhances the droplet formation by providing a double shearing action, and also provides a fluid separation or cushion between the water and the walls 36 of the mixing chamber 9. This prevents small water droplets being lost through coalescence on the internal walls of the mixing chamber 9 before exiting the mist generator via the exit 5.

Figure 20:
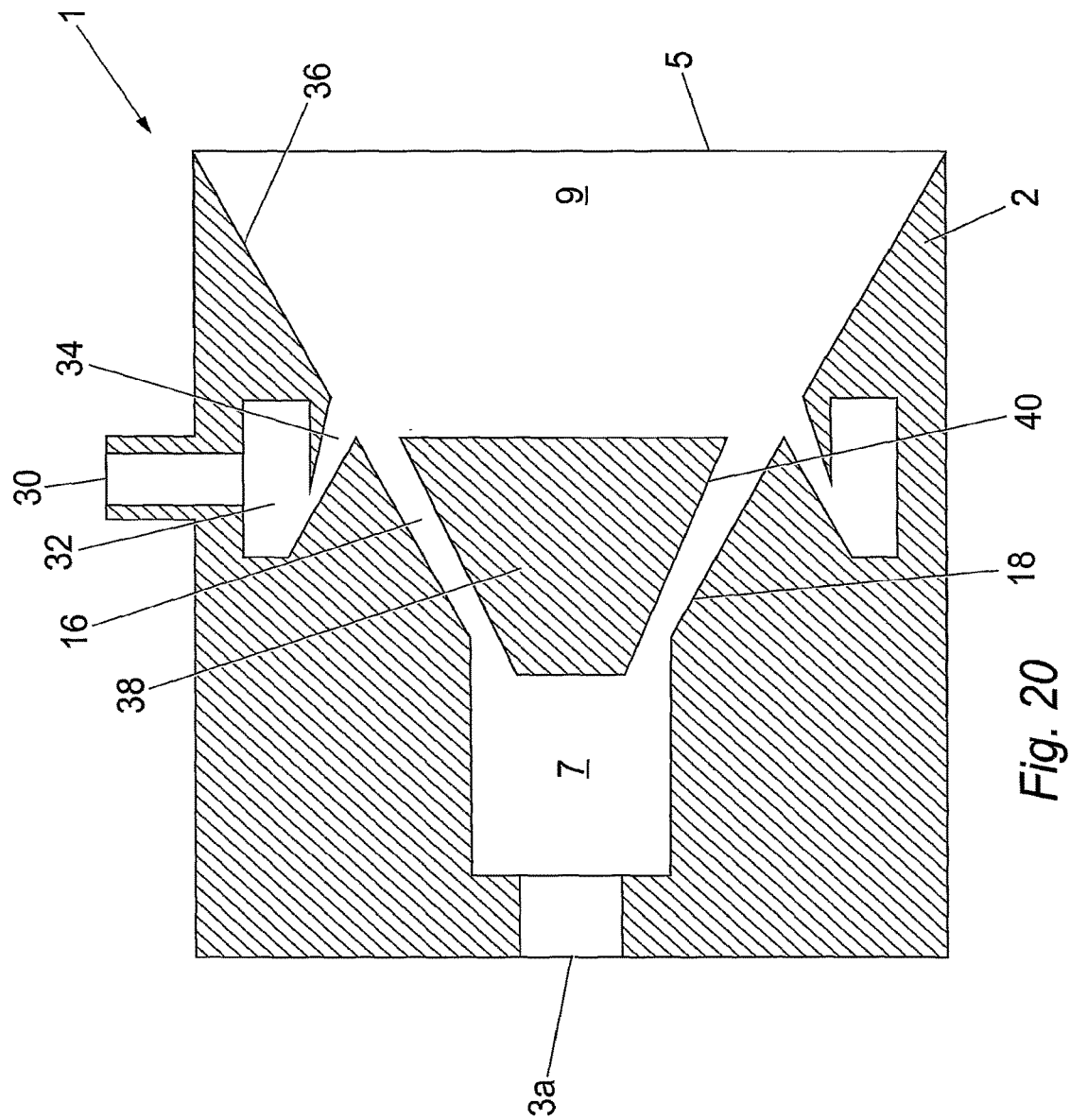

Referring now to FIG. 20, which shows a further embodiment of an apparatus for generating a mist (mist generator 1) comprising a conduit or housing 2, a transport fluid inlet 3a and plenum 7 provided in the housing 2 for the introduction of the transport fluid, steam, into a mixing chamber 9. The mist generator 1 also comprises a protrusion 38 at the end of the plenum 7 which is tapered on its relatively outer surface 40 and defines an annular transport nozzle 16 between it and a correspondingly tapered part 18 of the inner wall of the housing 2, the transport nozzle 16 being in fluid communication with the plenum 7.

The mist generator 1 includes a working fluid inlet 30 and plenum 32 provided in the housing 2, together with a working nozzle 34 formed at a location coincident with that of the transport nozzle 16.

This embodiment is provided with a diverging mixing chamber section 9 and the transport nozzle 16 and the working nozzle 34 are also angled to provide the desired angles of interaction between the transport and working fluid, thus occasioning the optimum energy transfer by momentum and mass transfer to enhance turbulence. The arrangement illustrated provides a diffuse or wide spray cone angle and therefore a wider mist coverage. The angle of the internal walls 36 of the mixing chamber 9 relative to the longitudinal centreline of the mist generator 1, and the angles of the nozzles 16, 34 relative to the walls 36, may be varied to provide different droplet sizes, droplet distributions, spray cone angles and projection ranges. In an alternative embodiment, not shown, the mixing chamber 9 may be converging. This provides a narrow concentrated mist spray, a greater axial velocity for the mist spray and therefore a greater projection range.

Figure 21:
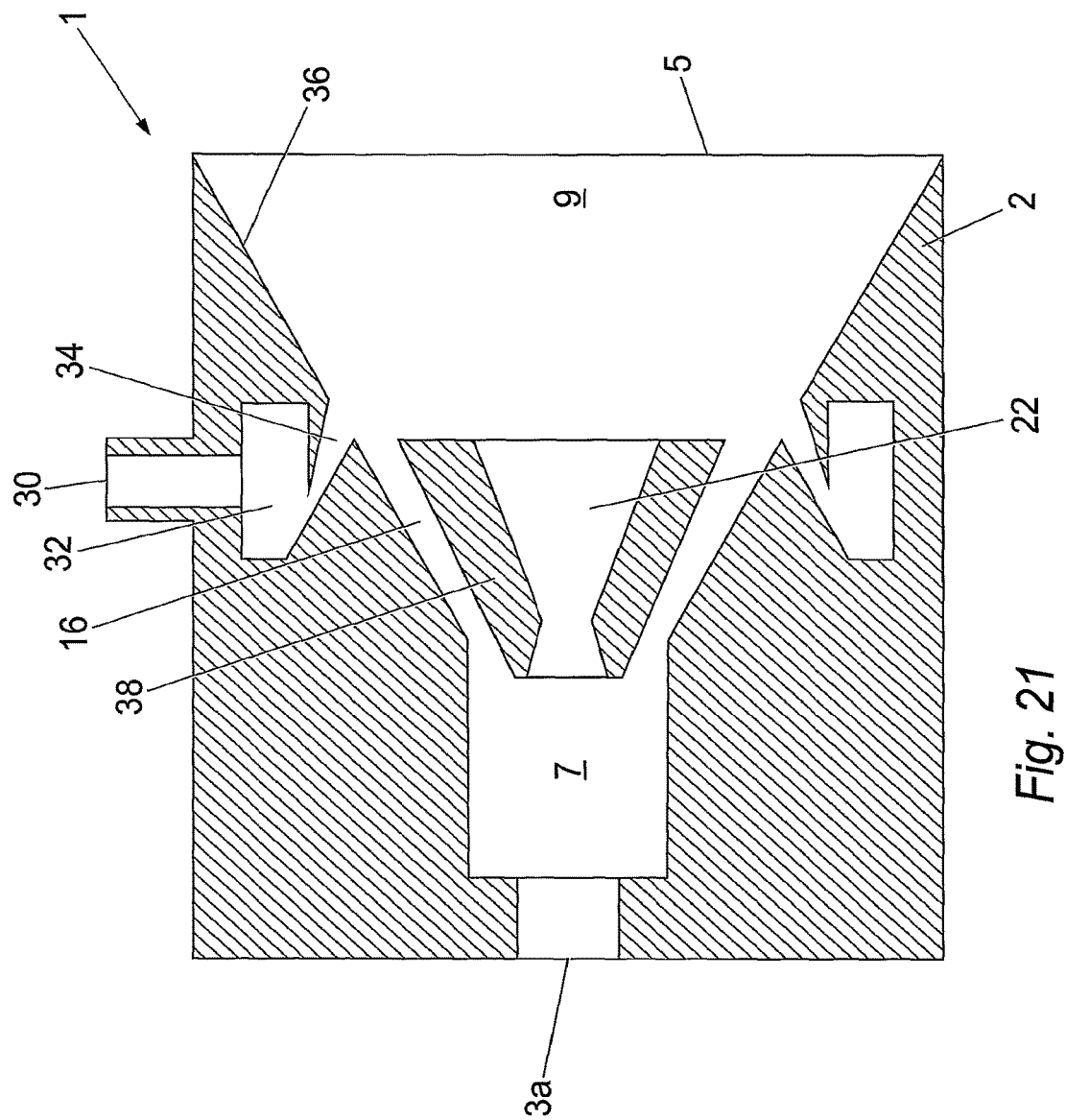

FIG. 21 shows a further embodiment substantially similar to that illustrated in FIG. 20 save that the protrusion 38 incorporates a parallel axis aligned supplementary nozzle 22, the nozzle 22 being in flow communication with a plenum 7.

The supplementary nozzle 22 is substantially similar to previous supplementary nozzles.

In operation the working fluid inlet 30 is connected to a source of working fluid, water. The inlet 3a is connected to a source of transport fluid, steam. Introduction of the steam into the inlet 3a, through the plenum 7 causes jets of steam to issue forth through the nozzles 16, 22. The parametric characteristics or properties of the steam are selected whereby in use the steam issues from the nozzles 16, 22 at supersonic speeds into the mixing chamber 9. The steam jet issuing from the nozzle 16 impacts the working fluid issuing from the working nozzle 34 with high shear forces, thus atomising the water into droplets and occasioning induction of the resulting water mist through the mixing chamber 9 towards an exit 5. The angle of the walls 36 of the mixing chamber 9 relative to the longitudinal centreline of the mist generator 1, and the angles of the nozzles 16, 22, 34 relative to the walls 36, may be varied to provide different droplet sizes, droplet distributions, spray cone angles and projection ranges.

It is to be appreciated that any feature or derivative of the embodiments shown in FIGS. 1 to 21 may be adopted or combined with one another to form other embodiments.

It is also to be appreciated that whilst the supplementary nozzles have been described in fluid communication with the transport fluid, it is anticipated that the supplementary nozzles may be connected to a second transport fluid.

It is an advantage of the present invention that the working nozzle(s) provides an annular flow having an even distribution of working fluid around the annulus.

With reference to the aforementioned embodiments of the present invention, the parametric characteristics or properties of the inlet, working and transport fluids, for example the flow rate, pressure, velocity, quality (e.g. dryness) and temperature, can be regulated to give the required intensity of shearing and droplet formation. The properties of the inlet, working and transport fluids being controllable by either external means, such as a pressure regulation means, or by the gap size (internal geometry) employed within the nozzles.

Although FIGS. 16, 17, 20, 21 illustrate the transport fluid inlet 3a located in a parallel axis to the longitudinal centreline of the mist generator 1, feeding transport fluid directly into plenum 7, it is envisaged that the transport fluid may be introduced through alternative locations, for example through a radial inlet such as inlet 3 as illustrated in FIG. 18, which in turn may feed either or both plenums 7 and 8 directly, or through an alternative parallel axis location feeding directly into plenum 8 rather than plenum 7 (not shown). Additionally the fluid inlet 30 may alternatively be positioned in a parallel axis location (not shown), feeding working fluid along the housing to the plenum 32.

In all embodiments of the present invention, the working nozzles may alternatively form the inlet for other fluids, or solids in flowable form such as a powder, to be dispersed for use in mixing or treatment purposes. For example, a second working nozzle may be provided to provide chemical treatment of the working fluid, such as a fire retardant, if necessary. The placement of the second working nozzle may be either upstream or downstream of the transport nozzle or where more than one transport nozzle is provided, the placement may be both upstream and downstream dependent upon requirements.

Referring to the embodiments shown in FIGS. 1, 12 to 14, for using the mist generator 1 as a fire suppressant in a room or other contained volume, the mist generator 1 may be either located entirely within the volume or room containing a fire, or located such that only the exit 5 protrudes into the volume. Consequently, the inlet fluid entering via inlet 4 may either be the gasses already within the room, these may range from cold gasses to hot products of combustion, or may be a separate fluid supply, for example air or an inert gas from outside the room. In the situation where the mist generator 1 is located entirely within the room, the induced flow through the passage 3 of the mist generator 1 may induce smoke and other hot combustion products to be drawn into the inlet 4 and be intimately mixed with the other fluids within the mist generator. This will increase the wetting and cooling effect on these gases and particles. It is also to be appreciated that the actual cooling mist will increase the wetting and cooling effect on the gasses and particles too.

Generating and introducing water mist containing a large amount of air into a potentially explosive environment such as a combustible gas filled room will result in both the reduction of risk of ignition from the water mist plus the dilution of the gas to a safe gas/oxygen ratio from the air.

If a fire in a contained volume has burnt most of the available oxygen, a water mist may be introduced but with the flow of air stopped. This helps to extinguish the remaining fire without the risk of adding more oxygen. To this end, the flow of the inlet fluid (air) through the inlet 4 may be controllable by restricting or even closing the inlet 4 completely. This could be accomplished by using a control valve. Alternatively, the embodiments shown in FIGS. 15 to 21 may be used in this scenario.

In a modification, an inert gas may be used as the inlet fluid in place of air, or, with regard to using the embodiments shown in FIGS. 15 to 21, a further working nozzle may be added to introduce an inert gas or non-flammable fluid to suppress the fire.

Similarly, powders or other particles may be entrained or introduced into the mist generator, mixed with and dispersed with another fluid or fluids. The particles being dispersed with the other fluid or fluids, or wetted and/or coated or otherwise treated prior to being projected.

The mist generator of the present invention has a number of fundamental advantages over conventional water mist systems in that the mechanism of droplet formation and size is controlled by a number of adjustable parameters, for example, the flow rate, pressure, velocity, quality and temperature of the inlet, transport and working fluid; the angular orientation and internal geometry of the transport, supplementary and working nozzles; the cross-sectional area and length of the mixing chamber 3A. This provides active control over the amount of water used, the droplet size, the droplet distribution, the spray cone angle and the projected range (distance) of the mist. For example, a water mist generator using steam as the transport fluid can produce a water mist with a substantially uniform droplet distribution having a substantial portion of droplets with a size less than 50 μm, with an adjustable spray cone angle and projected range of over 40 meters.

A key advantage of the present invention is that the uniform droplets formed, which have a substantial portion of droplets with a size less than 50 μm, have sufficient momentum, because of the momentum transfer, to project a sufficient distance and also penetrate into the heat of a fire, which is distinct with the prior art where droplet sizes less than 40 μm will have insufficient momentum to project a sufficient distance and also penetrate into the heat of a fire.

A major advantage of the present invention is its ability to handle relatively more viscous working fluids and inlet fluids than conventional systems. The shocks and the momentum transfer that takes place provide suction causing the mist generator to act like a pump. Also, the shearing effect and turbulence of the high velocity steam jet breaks up the viscous working fluid and mixes it, making it less viscous.

The mist generator can be used for either short burst operation or continuous or pulsed (intermittent) or discontinuous running.

As there are no moving parts in the system and the mist generator is not dependent on small sized and closely toleranced fluid inlet nozzles, there is very little maintenance required. It is known that due to the small orifice size and high water pressures used by some of the existing water mist systems, that nozzle wear is a major issue with these systems.

In addition, due to the use of relatively large fluid inlets in the mist generator it is less sensitive to poor water quality. In cases where the mist generator is to be used in a marine environment, even sea water may be used.

Although the mist generator may use a hot compressible transport fluid such as steam, this system is not to be confused with existing steam flooding systems which produce a very hot atmosphere. In the current invention, the heat transfer between the steam and the working fluid results in a relatively low water mist temperature. For example, the exit temperature within the mist at the point of exit 5 has been recorded at less than 52° C., reducing through continued heat transfer between the steam and water to room temperature within a short distance. The exit temperature of the discharge of water mist is controllable by regulation of the steam supply conditions, i.e. flow rate, pressure, velocity, temperature, etc., and the water flow rate conditions, i.e. flow rate, pressure, velocity, and temperature, and the inlet fluid conditions.

Droplet formation within the mist generator may be further enhanced with the entrainment of chemicals such as surfactants. The surfactants can be entrained directly into the mist generator and intimately mixed with the working fluid at the point of droplet formation, thereby minimising the quantity of surfactant required.

It is an advantage of the straight-through passage of the mist generator, and the relatively large inlet nozzle geometries, that it can accommodate material that might find its way into the passage. It is a feature of the present invention that it is far more tolerant of the water quality used than conventional water mist systems which depend on small orifices and close tolerance nozzles.

The ability of the mist generator to handle and process a range of working fluids provides advantages over many other mist generators. As the desired droplet size is achieved through high velocity shear and, in the case of steam as the transport fluid, mass transfer from a separate transport fluid, almost any working fluid can be introduced to the mist generator to be finely dispersed and projected. The working fluids can range from low viscosity easily flowable fluids and fluid/solid mixtures to high viscosity fluids and slurries. Even fluids or slurries containing relatively large sold particles can be handled.

It is this versatility that allows the present invention to be applied in many different applications over a wide range of operating conditions. Furthermore the shape of the mist generator may be of any convenient form suitable for the particular application. Thus the mist generator may be circular, curvilinear or rectilinear, to facilitate matching of the mist generator to the specific application or size scaling.

The present invention thus affords wide applicability with improved performance over the prior art proposals in the field of water mist generators.

In some embodiments of the present invention a series of transport nozzles and working nozzles is provided lengthwise of the passage and the geometry of the nozzles may vary from one to the other dependent upon the effect desire. For example, the angular orientation may vary one to the other. The nozzles may have differing geometries in order to afford different effects, i.e. different performance characteristics, with possibly differing parametric steam conditions. For example, some nozzles may be operated for the purpose of initial mixing of different liquids and gases whereas others are used simultaneously for additional droplet break-up or flow directionalisation. Each nozzle may have a mixing chamber section downstream thereof. In the case where a series of nozzles is provided the number of operational nozzles is variable.

The mist generator of the present invention may be employed in a variety of applications ranging from fire extinguishing, suppression or control to smoke or particle wetting.

Due to the relatively low pressures involved in the present invention, the mist generator can be easily relocated and re-directed while in operation. Using appropriate flexible steam and water supply pipes the mist generator is easily man portable. The unit can be considered portable from two perspectives. Firstly the transport nozzle(s) can be moved anywhere only constrained by the steam and water pipe lengths. This may have applications for fire fighting or decontamination when the nozzle can be man-handled to specific areas for optimum coverage of the mist. This 'umbilical' approach could be extended to situations where the nozzle is moved by a robotic arm or a mechanised system, being operated remotely. This may have applications in very hazardous environments.

Secondly, the whole system could be portable, i.e. the nozzle, a steam generator, plus a water/chemical supply is on a movable platform (e.g., self propelled vehicle). This would have the benefits of being unrestricted by any umbilical pipe lengths. The whole system could possibly utilise a backpack arrangement.

The present invention may also be used for mixing, dispersion or hydration and again the shearing mechanism provides the mechanism for achieving the desired result. In this connection the mist generator may be used for mixing one or more fluids, one or more fluids and solids in flowable or particulate form, for example powders. The fluids may be in liquid or gaseous form. This mechanism could be used for example in the fighting of forest fires, where powders and other additives, such as fire suppressants, can be entrained, mixed and dispersed with the mist spray.

In this area of usage lies another potential application in terms of foam generation for fire fighting purposes. The separate fluids, for example water, a foaming agent, and possibly air, are mixed within the mist generator using the transport fluid, for example steam, by virtue of the shearing effect.

Additionally, in fire or other high temperature environments the high density fine droplet mist generated by the mist generator provides a thermal barrier for people and fuel. In addition to reducing heat transfer by convection and conduction by cooling the air and gasses between the heat source and the people or fuel, the dense mist also reduces heat transfer by radiation. This has particular, but not exclusive, application to fire and smoke suppression in road, rail and air transport, and may greatly enhance passenger post-crash survivability.

The fine droplet mist generated by the present invention may be employed for general cooling applications. The high cooling rate and low water quantities used provide the mechanism for cooling of industrial machinery and equipment. For example, the fine droplet mist has particular application for direct droplet cooling of gas turbine inlet air. The fine droplet mist, typically a water mist, is introduced into the inlet air of the gas turbine and due to the small droplet size and large evaporative surface area, the water mist evaporates, cooling the inlet air. The cooling of the inlet air boosts the power of the gas turbine when it is operating in hot environments.

Also, the very fine droplet mist produced by the mist generator may be utilised for cooling and humidifying area or spaces, either indoors or outdoors, for the purpose of providing a more habitable environment for people and animals.

The mist generator may be employed either indoors or outdoors for general watering applications, for example, the watering of the plants inside a greenhouse. The water droplet size and distribution may be controlled to provide the appropriate watering mechanism, i.e. either root or foliage wetting, or a combination of both. In addition, the humidity of the greenhouse may also be controlled with the use of the mist generator.

The mist generator may be used in an explosive atmosphere to provide explosion prevention. The mist cools the atmosphere and dampens any airborne particulates, thus reducing the risk of explosion. Additionally, due to the high cooling rate and wide droplet distribution afforded by the fine droplet mist the mist generator may be employed for explosion suppression, particularly in a contained volume. The mist generator has a further advantage for use in potentially explosive atmospheres as it has no moving parts or electrical wires or circuitry and therefore has minimum sources of ignition.

A fire within a contained room will generally produce hot gasses which rise to the ceiling. There is therefore a temperature gradient formed with high temperatures at or near the ceiling and lower temperatures towards the floor. In addition, the gasses produced will generally become stratified within the room at different heights. An advantage of the present invention is that the turbulence and projection force of the mist helps to mix the gasses within the room, mixing the high temperature gasses with the low temperature gasses, thus reducing the hot spot temperatures of the room.

This mixing of the room's gasses, and the turbulent mist itself, which behaves more akin to a gas cloud, is able to reach non line-of-sight areas, so eliminating all hot spots (pockets of hot gasses) and possible re-ignition zones. A further advantage of the present invention is that the smaller water droplets have more of a tendency to remain airborne, thereby cooling the gases and the combustion products of the fire. This improves the rate of cooling of the fire and also reduces damage to items in the vicinity of the fire.

The turbulence and projection force of the mist allows for substantially all of the surfaces in the room to be cooled or decontaminated, even the non line of sight surfaces.

In addition, the turbulence and projection force of the mist cause the water droplets to become attached to hydroscopic nuclei suspended in the gasses, causing the nuclei to become heavier and fall to the floor, where they are more manageable; particularly in decontamination applications. The water droplets generated by the present invention have more of a tendency to become attached to the nuclei by virtue of their smaller size.

The mist generator may be used to deliberately create hydroscopic nuclei within the room for the purpose outlined above.

Due to the particle wetting of the gasses in a contained volume by the mist generator and the turbulence created within the apparatus and by the cooling mist itself, pockets of gas are dispersed, thereby limiting the chance of explosion.

The present invention has the additional benefit of wetting or quenching of explosive or toxic atmospheres utilising either just the steam, or with additional entrained water and/or chemical additives. The later configuration could be used for placing the explosive or toxic substances in solution for safe disposal.

Using a hot compressible transport fluid, such as steam, may provide an additional advantage of providing control of harmful bacteria. The shearing mechanism afforded by the present invention coupled with the heat input of the steam destroys the bacteria in the fluid flow, thereby providing for the sterilisation of the working fluid. The sterilisation effect could be enhanced further with the entrainment of chemicals or other additives which are mixed into the working fluid. This may have particular advantage in applications such as fire fighting, where the working fluid, such as water, is advantageously required to be stored for some time prior to use. During operation, the mist generator effectively sterilises the water, destroying bacterium such as *legionella pneumophila*, during the droplet creation phase, prior to the water mist being projected from the mist generator.

The fine droplet mist produced by the mist generator might be advantageously employed where there has been a leakage or escape of chemical or biological materials in liquid or gaseous form. The atomised spray provides a mist which effectively creates a blanket saturation of the prevailing atmosphere giving a thorough wetting result. In the case where chemical or biological materials are involved, the mist wets the materials and occasions their precipitation or neutralisation, additional treatment could be provided by the introduction or entrainment of chemical or biological additives into the working fluid. For example disinfectants may be entrained or introduced into the mist generator, and introduced into a room to be disinfected in a mist form. For decontamination applications, such as animal decontamination or agricultural decontamination, no premix of the chemicals is required as the chemicals can be entrained directly into the unit and mixed simultaneously. This greatly reduces the time required to start decontamination and also eliminates the requirement for a separate mixer and holding tank.

The mist generator may be deployed as an extractor whereby the injection of the transport fluid, for example steam, effects induction of a gas for movement from one zone to another. One example of use in this way is to be found in fire fighting when smoke extraction at the scene of a fire is required.

Further the mist generator may be employed to suppress or dampen down particulates from a gas. This usage has particular, but not exclusive, application to smoke and dust suppression from a fire. Additional chemical additives in fluid and/or powder form may be entrained and mixed with the flow for treatment of the gas and/or particulates.

Further the mist generator for scrubbing particulate materials from a gas stream, to effect separation of wanted elements from waste elements. Additional chemical additives in fluid and/or powder form may be entrained and mixed with the flow for treatment of the gas and/or particulates. This usage has particular, but not exclusive, application to industrial exhaust scrubbers and dust extraction systems.

The use of the mist generator is not limited to the creation of water droplet mists. The mist generator may be used in many different applications which require a fluid to be broken down into a fine droplet mist. For example, the mist generator may be used to atomise a fuel, such as fuel oil, for the purpose of enhancing combustion. In this example, using steam as the transport fluid and a liquid fuel as the working fluid produces a finely dispersed mixture of fine fuel droplets and water droplets. It is well known in the art that such mixtures when combined with oxygen provides for enhanced combustion. In this example, the oxygen, possibly in the form of air, could also be entrained, mixed with and projected with the fuel/steam mist by the mist generator. Alternatively, a different transport fluid could be used and water or another fluid can be entrained and mixed with the fuel within the mist generator.

Alternatively, using a combustible fuel and air as the working fluids, but with a source of ignition at the exit of the unit, the mist generator may be employed as a space heater.

Further, the mist generator may be employed as an incinerator or process heater. In this example, a combustible fluid, for example propane, may be used as the transport fluid, introduced to the mist generator under pressure. In this example the working fluid may be an additional fuel or material which is required to be incinerated. Interaction between the transport fluid and working fluid creates a well mixed droplet mist which can be ignited and burnt in the mixing chamber or a separate chamber immediately after the exit.

Alternatively, the transport fluid can be ignited prior to exiting the transport nozzles, thereby presenting a high velocity and high temperature flame to the working fluid.

The mist generator affords the ability to create droplets created of a multi fluid emulsion. The droplets may comprise a homogeneous mix of different fluids, or may be formed of a first fluid droplet coated with an outer layer or layers of a second or more fluids. For example, the mist generator may be employed to create a fuel/water emulsion droplet mist for the purpose of further enhancing combustion. In this example, the water may either be separately entrained into the mist generator, or provided by the transport fluid itself, for example from the steam condensing upon contact with the working fluid. Additionally, the oxygen required for combustion, possibly in the form of air, could also be entrained, mixed with and projected with the fuel/steam mist by the generator.

The mist generator may be employed for low pressure impregnation of porous media. The working fluid or fluids, or fluid and solids mixtures being dispersed and projected onto a porous media, so aiding the impregnation of the working fluid droplets into the material.

The mist generator may be employed for snow making purposes. This usage has particular but not exclusive application to artificial snow generation for both indoor and outdoor ski slopes. The fine water droplet mist is projected into and through the cold air whereupon the droplets freeze and form a frozen droplet 'snow'. This cooling mechanism may be further enhanced with the use of a separate cooler fitted at the exit of the mist generator to enhance the cooling of the water mist. The parametric conditions of the mist generator and the transport fluid and working fluid properties and temperatures are selected for the particular environmental conditions in which it is to operate. Additional fluids or powders may be entrained and mixed within the mist generator for aiding the droplet cooling and freezing mechanism. A cooler transport fluid than steam could be used.

The high velocity of the water mist spray may advantageously be employed for cutting holes in compacted snow or ice. In this application the working fluid, which may be water, may advantageously be preheated before introduction to the mist generator to provide a higher temperature droplet mist. The enhanced heat transfer with the impact surface afforded by the water being in a droplet form, combined with the high impact velocity of the droplets provide a melting/cutting through the compacted snow or ice. The resulting waste water from this cutting operation is either driven by the force of the issuing water mist spray back out through the hole that has been cut, or in the case of compacted snow may be driven into the permeable structure of the snow. Alternatively, some or all of the waste water may be introduced back into the mist generator, either by entrainment or by being pumped, to provide or supplement the working fluid supply. The mist generator may be moved towards the 'cutting face' of the holes as the depth of the hole increases. Consequently, the transport fluid and the water may be supplied to the mist generator co-axially, to allow the feed supply pipes to fit within the diameter of the hole generated. The geometry of the nozzles, the mixing chamber and the outlet of the mist generator, plus the properties of the transport fluid and working fluid are selected to produce the required hole size in the snow or ice, and the cutting rate and water removal rate.

Modifications may be made to the present invention without departing from the scope of the invention, for example, the supplementary nozzle, or other additional nozzles, could be used in the form of NACA ducts, which are used to bleed high pressure from a high pressure surface to a low pressure surface to maintain the boundary layer on the surfaces and reduce drag.

The NACA ducts may be employed on the mist generator 1 from the perspective of using drillings through the housing 2 to feed a fluid to a wall surface flow. For example, additional drillings could be employed to simply feed air or steam through the drillings to increase the turbulence in the mist generator and increase the turbulent break up. The NACA ducts may also be angled in such a way to help directionalise the mist emerging from the mist generator. Holes or even an annular nozzle may be situated on the trailing edge of the mist generator to help to force the exiting mist to continue to expand and therefore diffuse the flow (an exiting high velocity flow will tend to want to converge).

NACA ducts could be employed, depending on the application, by using the low pressure area within the mist generator to draw in gasses from the outside surface to enhance turbulence. NACA ducts may have applications in situations where it is beneficial to draw in the surrounding gasses to be processed with the mist generator, for example, drawing in hot gasses in a fire suppression role may help to cool the gasses and circulate the gasses within the room.

Enhancing turbulence in the mist generator helps to both increase droplet formation (with smaller droplets) and also the turbulence of the generated mist. This has benefits in fire suppression and decontamination of helping to force the mist to mix within the mist generator and wet all surfaces and/or mix with the hot gasses. In addition to the aforesaid, turbulence may be induced by the use of guide vanes in either the nozzles or the passage. Turbulators may be helical in form or of any other form which induces swirl in the fluid stream.

As well as turbulators increasing turbulence, they will also reduce the risk of coalescence of the droplets on the turbulator vanes/blades.

The turbulators themselves could be of several forms, for example, surface projections into the fluid path, such as small projecting vanes or nodes; surface groves of various profiles and orientations as shown in FIGS. 5 to 10; or larger systems which move or turn the whole flow—these may be angled blades across the whole bore of the flow, of either a small axial length or of a longer 'Archimedes type design. In addition, elbows of varying angles positioned along varies planes may be used to induce swirl in the flow streams before they enter their respective inlets.

It is anticipated that the mist generator may include piezoelectric or ultrasonic actuators that vibrate the nozzles to enhance droplet break up.

The invention claimed is:

1. Apparatus for generating a mist comprising:
a conduit having a mixing chamber and an exit;
a first annular transport fluid nozzle in fluid communication with the conduit, the first transport fluid nozzle being adapted to introduce a transport fluid into the mixing chamber;
a second annular transport fluid nozzle in fluid communication with the conduit, the second transport fluid nozzle being adapted to introduce further transport fluid or a second transport fluid into the mixing chamber; and
an annular working fluid nozzle positioned adjacent the first transport fluid nozzle intermediate the first transport fluid nozzle and the exit, the working fluid nozzle being adapted to introduce a working fluid into the mixing chamber;
wherein the first transport fluid nozzle and the working fluid nozzle have an angular orientation and internal geometry such that in use interaction of the transport fluid and working fluid in the mixing chamber causes the working fluid to atomise and form a dispersed vapour/droplet flow regime, which is discharged as a mist from the exit, the mist comprising working fluid droplets;
wherein each of the working fluid nozzle, the first transport fluid nozzle, and the second transport fluid nozzle comprise an annular nozzle that circumscribes the conduit and provides fluid into the mixing chamber,
wherein each of the first transport fluid nozzle, the working fluid nozzle, and the second transport fluid nozzle include a corresponding convergent-divergent portion, a first portion of the first transport fluid nozzle downstream of the corresponding convergent-divergent portion defining a first axis, a second portion of the working fluid nozzle downstream of the corresponding convergent-divergent portion defining a second axis, an angle between the first axis and the second axis being acute such that the first transport fluid nozzle is angled towards a stream of working fluid from the working fluid nozzle; and wherein the second annular transport fluid nozzle is positioned nearer to the exit of the conduit than the working fluid nozzle, such that the working fluid nozzle is intermediate both the first transport fluid nozzle and the second annular transport fluid nozzle.

2. Apparatus for generating a mist comprising:

a conduit having a mixing chamber and an exit;

a first transport nozzle in fluid communication with the conduit, the first transport nozzle being adapted to introduce a transport fluid into the mixing chamber;

a second transport nozzle in fluid communication with the said conduit, the second transport nozzle being adapted to introduce further transport fluid or a second transport fluid into the mixing chamber;

a working nozzle positioned adjacent the first transport nozzle intermediate the first transport nozzle and the exit, the working nozzle being adapted to introduce a working fluid into the mixing chamber;

wherein the second transport nozzle is positioned nearer the exit than the working nozzle, such that the working nozzle is intermediate both transport nozzles, and wherein the transport and working nozzles have an angular orientation and internal geometry such that in use interaction of the transport fluid and working fluid in the mixing chamber causes the working to atomise and form a dispersed vapour/droplet flow regime, which is discharged as a mist from the exit, the mist comprising working fluid droplets;

wherein each of the first transport nozzle, the working nozzle, and the second transport nozzle include a convergent-divergent portion, and the working fluid nozzle is annular, a first portion of the first transport nozzle downstream of the corresponding convergent-divergent portion defining a first axis, a second portion of the working nozzle downstream of the corresponding convergent-divergent portion defining a second axis, an angle between the first axis and the second axis being acute such that the first transport nozzle is angled towards a stream of working fluid from the working nozzle.

3. The apparatus of claim 2, wherein at least one of the first transport nozzle, the second transport nozzle, and the working nozzle circumscribes the conduit.

4. The apparatus of claim 2, wherein the angular orientation and internal geometry of the transport and working nozzles is such that the size of the working fluid droplets is less than 50 μm.

5. The apparatus of claim 2, wherein the mixing chamber includes a converging portion.

6. The apparatus of claim 2, wherein the mixing chamber includes a diverging portion.

7. The apparatus of claim 2, wherein the mixing chamber includes an inlet adapted to introduce an inlet fluid into the mixing chamber, the inlet being distal from the exit, the transport and working nozzles being arranged intermediate the inlet and exit.

8. The apparatus of claim 2, wherein the transport nozzles have inner and outer surfaces each being substantially frustoconical in shape.

9. The apparatus of claim 2, wherein the working nozzle has a convergent-divergent profile.

10. The apparatus of claim 2, wherein the working nozzle has inner and outer surfaces each being substantially frustoconical in shape.

11. The apparatus of claim 2, wherein the internal geometry of the transport nozzle has an area ratio, namely exit area to throat area, in the range 1.75 to 15, having an included angle α substantially equal to or less than 6 degrees for supersonic flow and substantially equal to or less than 12 degrees for sub-sonic flow.

12. The apparatus of claim 2, wherein the transport nozzle is oriented at an angle β of between 0 to 30 degrees.

13. The apparatus of claim 2, herein the mixing chamber is closed upstream of the transport nozzle.

14. The apparatus of claim 2, wherein the exit of the apparatus is provided with a cowl to control the mist.

15. The apparatus of claim 2, wherein the conduit includes a passage.

16. The apparatus of claim 15, wherein at least one of the passage, the transport nozzles, or the working nozzle has a turbulator to induce turbulence of the fluid therethrough prior to the fluid being introduced into the mixing chamber.

17. The apparatus of claim 2, comprising:

the first transport nozzle and the working nozzle are continuous.

* * * * *